United States Patent
Mori

(10) Patent No.: US 9,876,942 B2
(45) Date of Patent: Jan. 23, 2018

(54) IMAGE PROCESSING APPARATUS AND COMPUTER PROGRAM

(71) Applicant: BROTHER KOGYO KABUSHIKI KAISHA, Nagoya-shi, Aichi-ken (JP)

(72) Inventor: Hiroko Mori, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 4 days.

(21) Appl. No.: 15/062,397

(22) Filed: Mar. 7, 2016

(65) Prior Publication Data

US 2016/0286089 A1 Sep. 29, 2016

(30) Foreign Application Priority Data

Mar. 27, 2015 (JP) ................. 2015-065736

(51) Int. Cl.
*H04N 1/60* (2006.01)
*H04N 1/00* (2006.01)

(52) U.S. Cl.
CPC ....... *H04N 1/6008* (2013.01); *H04N 1/00477* (2013.01); *H04N 1/00806* (2013.01); *H04N 2201/0094* (2013.01)

(58) Field of Classification Search
CPC ................ H04N 1/6008; H04N 1/00477
See application file for complete search history.

(56) References Cited

U.S. PATENT DOCUMENTS

| | | |
|---|---|---|
| 5,909,506 A | 6/1999 | Goto |
| 2002/0031256 A1 | 3/2002 | Hiramatsu et al. |
| 2005/0212814 A1 | 9/2005 | Kubo |
| 2007/0041027 A1 | 2/2007 | Malik et al. |
| 2009/0324074 A1* | 12/2009 | Dembo ............... G06T 5/009 382/168 |

(Continued)

FOREIGN PATENT DOCUMENTS

| | | |
|---|---|---|
| JP | H11-031052 A | 2/1999 |
| JP | 2005-151089 A | 6/2005 |

(Continued)

OTHER PUBLICATIONS

U.S. Appl. No. 15/062,389, filed Mar. 7, 2016.

(Continued)

*Primary Examiner* — Ibrahim Siddo
(74) *Attorney, Agent, or Firm* — Scully, Scott, Murphy & Presser, PC

(57) ABSTRACT

An image processing apparatus includes: a controller configured to perform: acquiring original image data representing an original image and corrected image data representing a corrected image, the corrected image data being generated by executing specific correction processing on the original image data; calculating a first index value and a second index value, the first index value relating to a color distribution of the original image by using the original image data, and the second index value relating to a color distribution of the corrected image by using the corrected image data; and determining which processing, among a plurality of processing candidates that are executable by the image processing apparatus, corresponds to the specific correction processing, based on comparison of the calculated first index value and the calculated second index value.

18 Claims, 15 Drawing Sheets

(56) References Cited

U.S. PATENT DOCUMENTS

2014/0099026 A1 4/2014 Krishnaswamy et al.
2014/0348427 A1 11/2014 Brendel
2015/0326752 A1* 11/2015 Hayasaki ............ H04N 1/4074
                                                  358/522

FOREIGN PATENT DOCUMENTS

| JP | 2006339874 | * | 1/2006 |
| JP | 2006-339874 A | | 12/2006 |
| JP | 2011-188484 A | | 9/2011 |
| JP | 2013-142955 A | | 7/2013 |
| JP | 2013-196131 A | | 9/2013 |

OTHER PUBLICATIONS

Official Action dated Jun. 16, 2016 from related U.S. Appl. No. 15/062,389.
Official Action dated Nov. 27, 2017 from related U.S. Appl. No. 15/062,389.

* cited by examiner

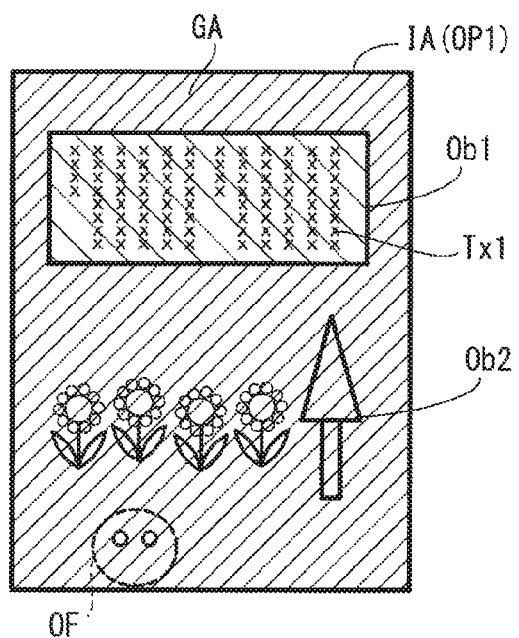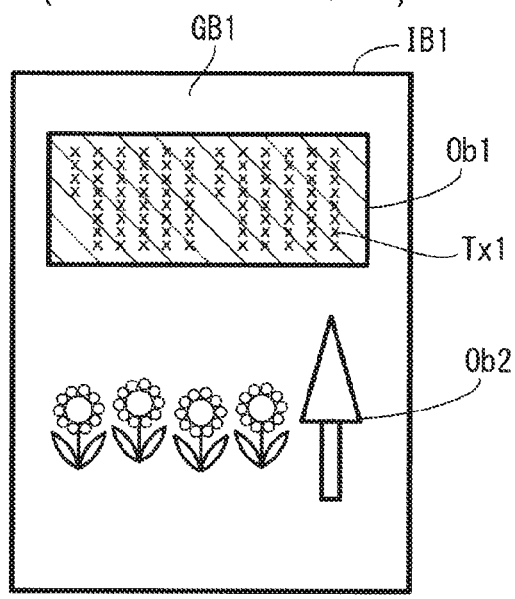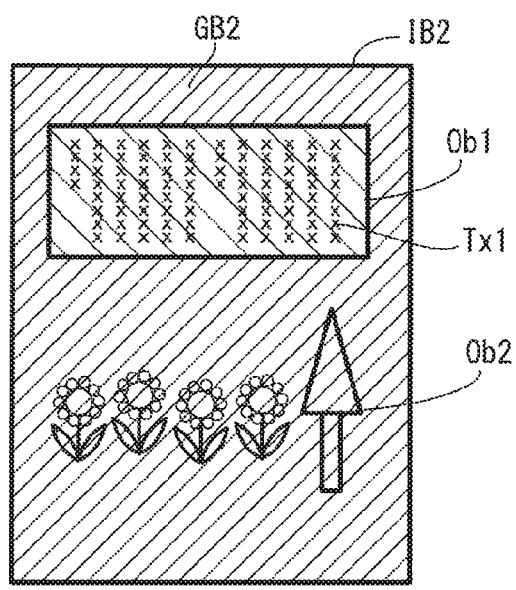

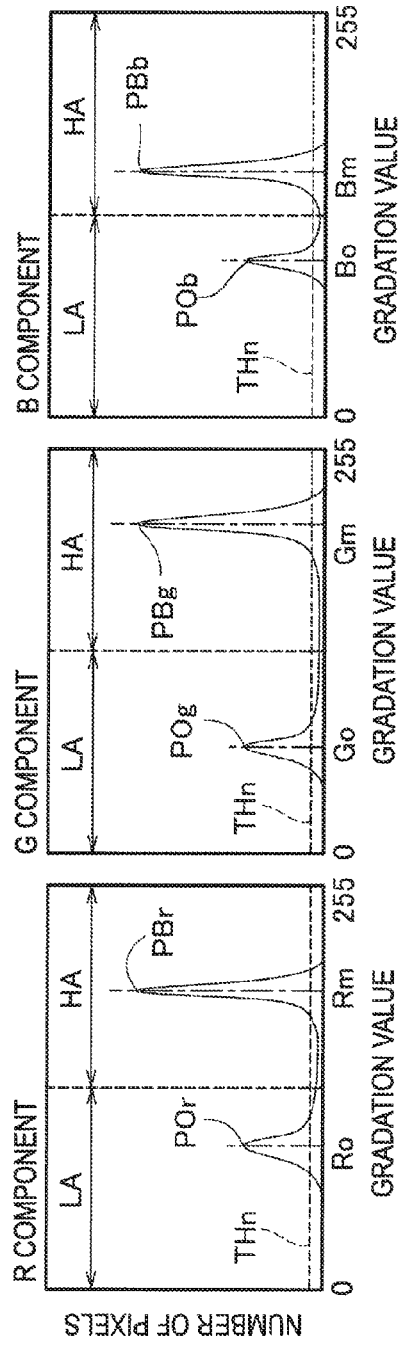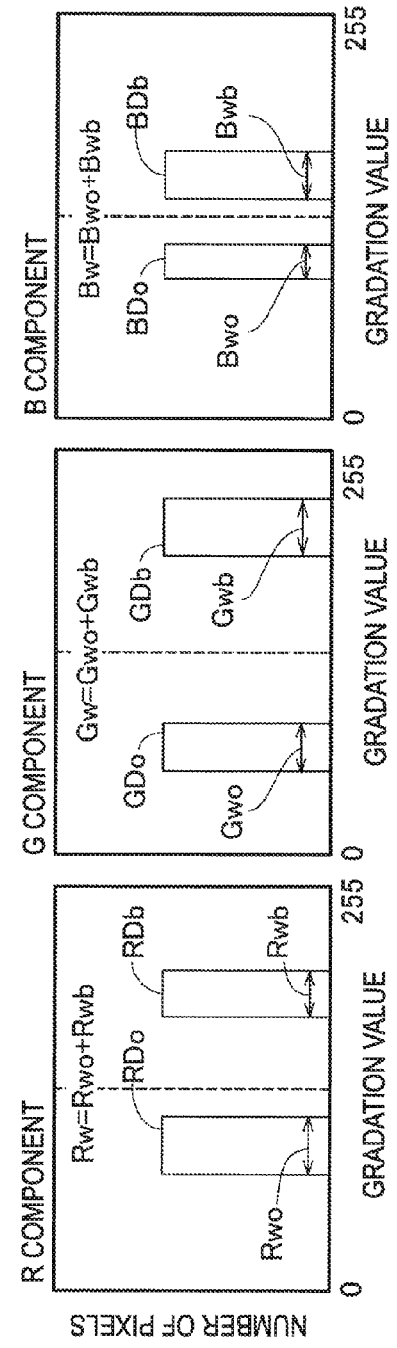

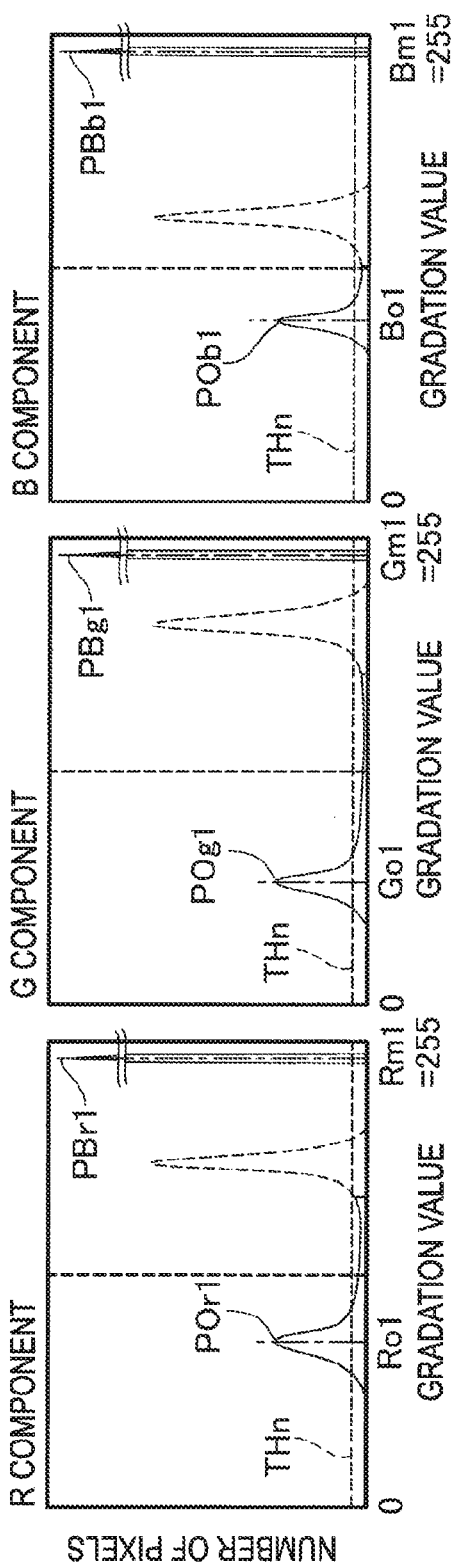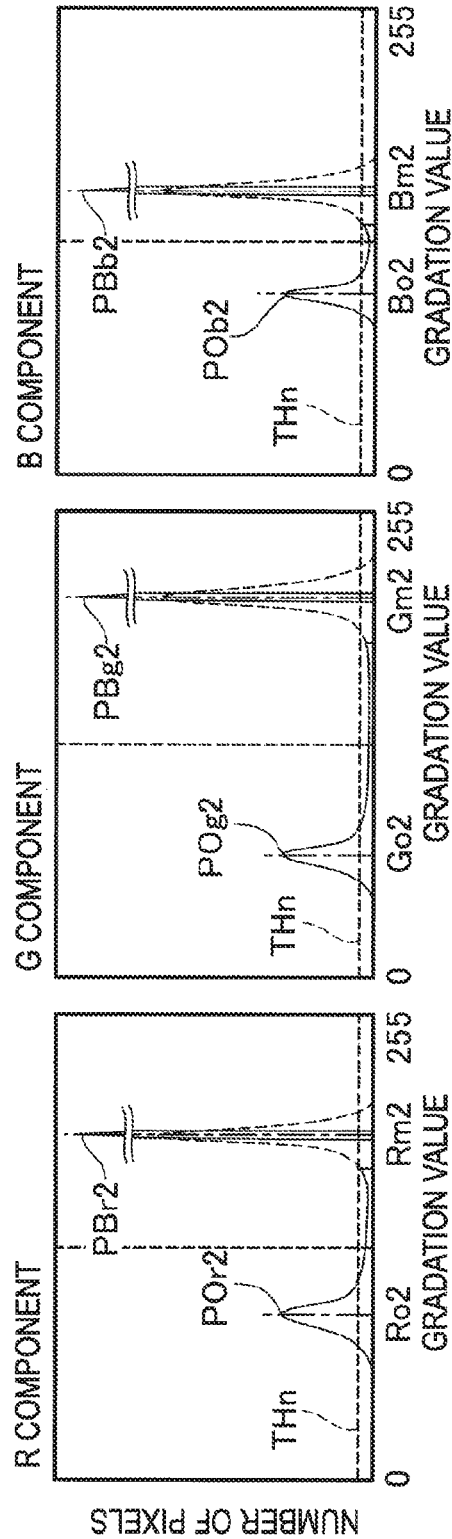

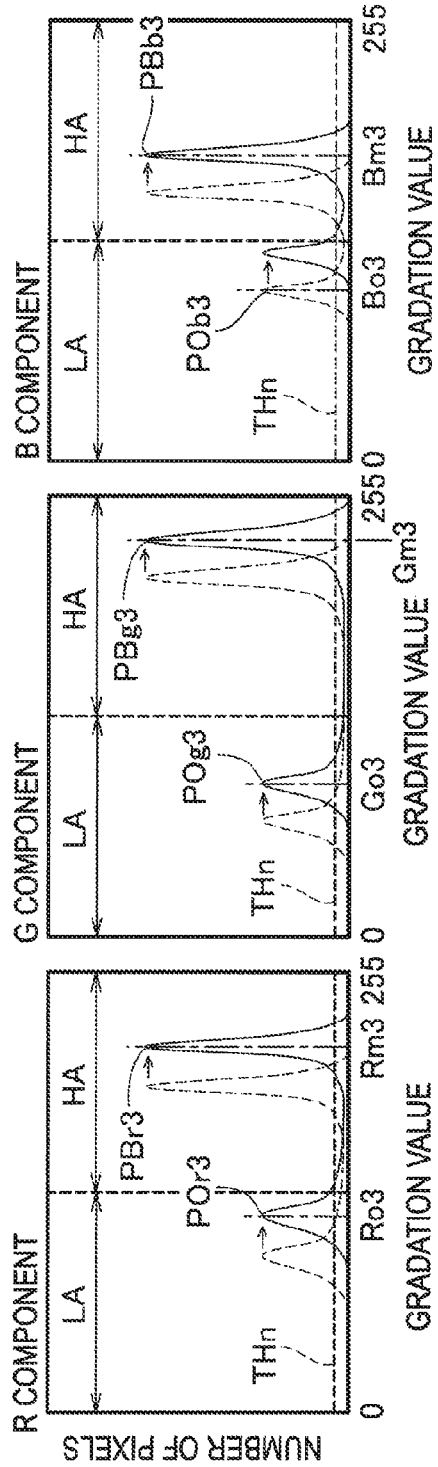
FIG. 10A THIRD CORRECTED IMAGE (OVERALL BRIGHTNESS CORRECTION)
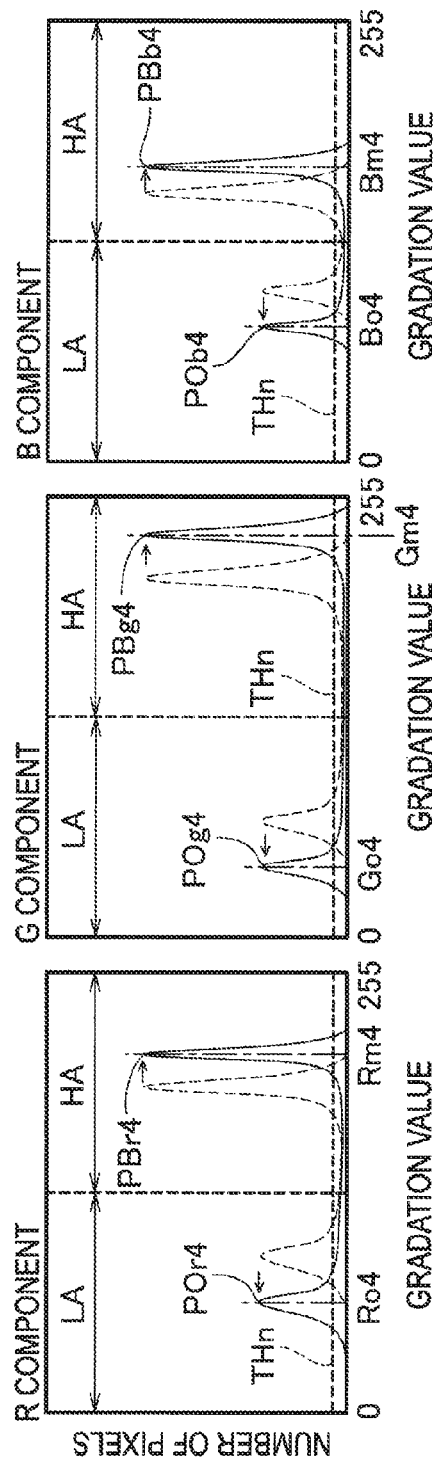
FIG. 10B FOURTH CORRECTED IMAGE (CONTRAST CORRECTION)

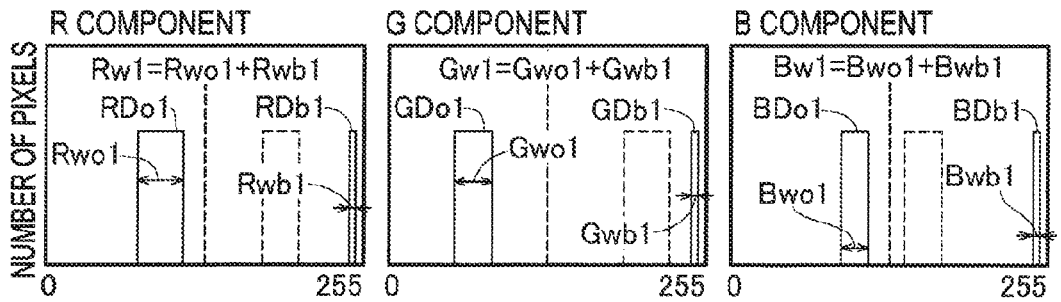
FIG. 11A CORRECTED IMAGE (BACKGROUND REMOVED)
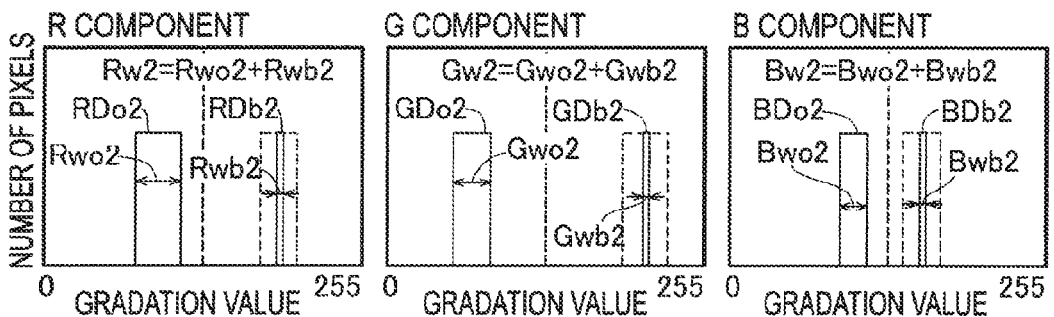
FIG. 11B CORRECTED IMAGE (GHOSTING REMOVED)
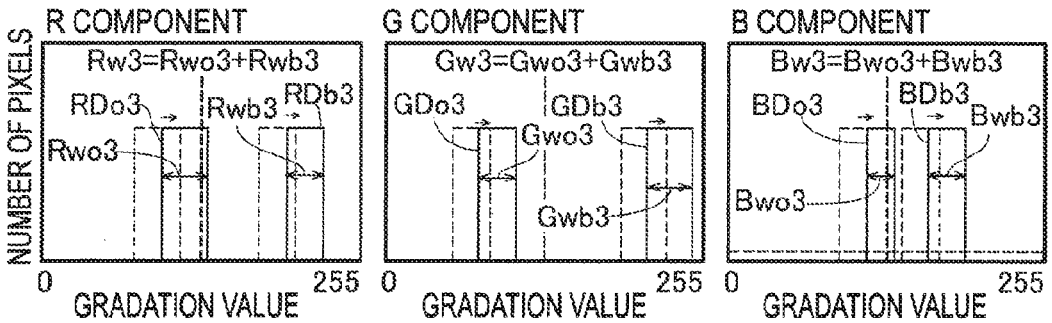
FIG. 11C CORRECTED IMAGE (OVERALL BRIGHTNESS CORRECTION)
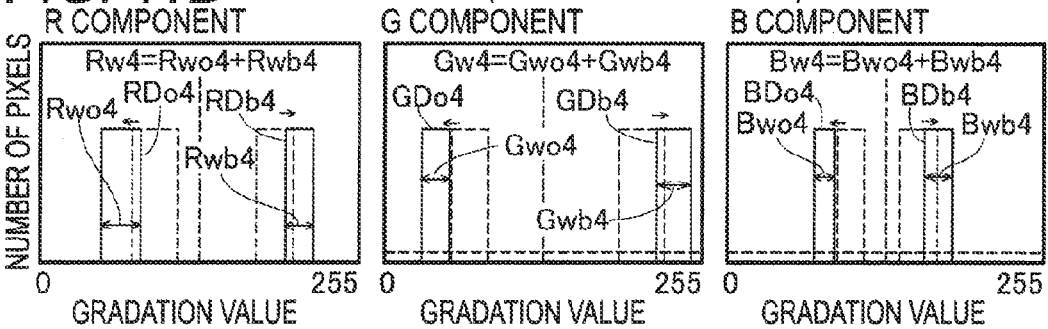
FIG. 11D CORRECTED IMAGE (CONTRAST CORRECTION)

IMAGE PROCESSING APPARATUS AND COMPUTER PROGRAM

CROSS-REFERENCE TO RELATED APPLICATION

This application claims priority from Japanese Patent Application No. 2015-065736 filed on Mar. 27, 2015, the entire subject matter of which is incorporated herein by reference.

TECHNICAL FIELD

This disclosure relates to image processing of executing correction processing for image data, which is generated by optically reading a document.

BACKGROUND

A technology of performing correction processing for image data, which is generated by optically reading a document with a reading apparatus such as a scanner, has been known. For example, JP2006-339874A discloses a technology of changing a value of a pixel indicative of a specific color in an image into a value of a pixel indicative of white. According to this technology, a color palette is displayed on a multifunction machine color liquid crystal panel, so that an instruction of the specific color is received from a user.

However, there is a variety of correction processing, in addition to the above correction processing of changing the specific color into the white. It cannot be said that a user can easily select appropriate correction processing from the plural types of processing. Specifically, a user who does not know about the correction processing well may have a difficulty in selecting the appropriate correction processing. Therefore, it is required to reduce a trouble of the user who uses the correction processing.

SUMMARY

This disclosure provides a technology capable of reducing a trouble of a user who uses correction processing to be executed for image data.

The disclosed technology can be implemented as following application examples.

An image processing apparatus of an application example of this disclose includes a controller configured to perform: acquiring original image data representing an original image and corrected image data representing a corrected image, the corrected image data being generated by executing specific correction processing on the original image data; calculating a first index value and a second index value, the first index value relating to a color distribution of the original image by using the original image data, and the second index value relating to a color distribution of the corrected image by using the corrected image data; and determining which processing, among a plurality of processing candidates that are executable by the image processing apparatus, corresponds to the specific correction processing, based on comparison of the calculated first index value and the calculated second index value.

According to the above configuration, it is possible to appropriately determine which of plural types of candidates for processing that is executable by the image processing corresponds to the specific correction processing executed for the original image data, according to the color distribution of the original image and the color distribution of the corrected image. As a result, for example, it is possible to notify the determined correction processing to a user and to automatically execute the determined correction processing, so that it is possible to reduce a trouble of the user who uses the correction processing.

An image processing apparatus of another application example of this disclose includes a controller configured to perform: acquiring original image data representing an original image, corrected image data representing a corrected image and target image data indicative of an image of a correction target, the corrected image data being generated by executing specific correction processing on the original image data; determining which processing, among a plurality of processing candidates that are executable by the image processing apparatus, corresponds to the specific correction processing, based on comparison of the original image data and the corrected image data; determining a parameter for the processing corresponding to the specific correction processing, the specific correction processing being determined among the plurality of the processing candidates; and executing the processing determined among the plurality of the processing candidates for the target image data by using the determined parameter.

According to the above configuration, it is possible to appropriately determine to which of the plurality of processing candidates capable of executing the image processing the specific correction processing executed for the original image data corresponds, based on the comparison of the original image data and the corrected image data. A parameter for the determined processing is determined, and the determined processing is executed for the target image data by using the parameter. As a result, it is possible to reduce a user's burden to set the parameter and the type of the correction processing at the image processing apparatus.

In the meantime, the disclosed technology can be implemented into a variety of forms, for example, a control device of an image reading apparatus, an image processing method, a computer program for implementing functions of the apparatus and method, a recording medium having the computer program recorded therein, and the like.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 4A to 4C illustrate an example of an original image and a corrected image;

FIGS. 8A and 8B illustrate an example of a histogram of an original image IA and a distribution area of the original image IA;

FIGS. 9A and 9B illustrate an example of a histogram of a corrected image IB;

FIGS. 10A and 10B illustrate an example of the histogram of the corrected image IB;

FIGS. 11A to 11D illustrate an example of a distribution area of the corrected image IB;

DETAILED DESCRIPTION

A. Illustrative Embodiment

A-1: Configuration of Multifunction Machine

Figure 1:
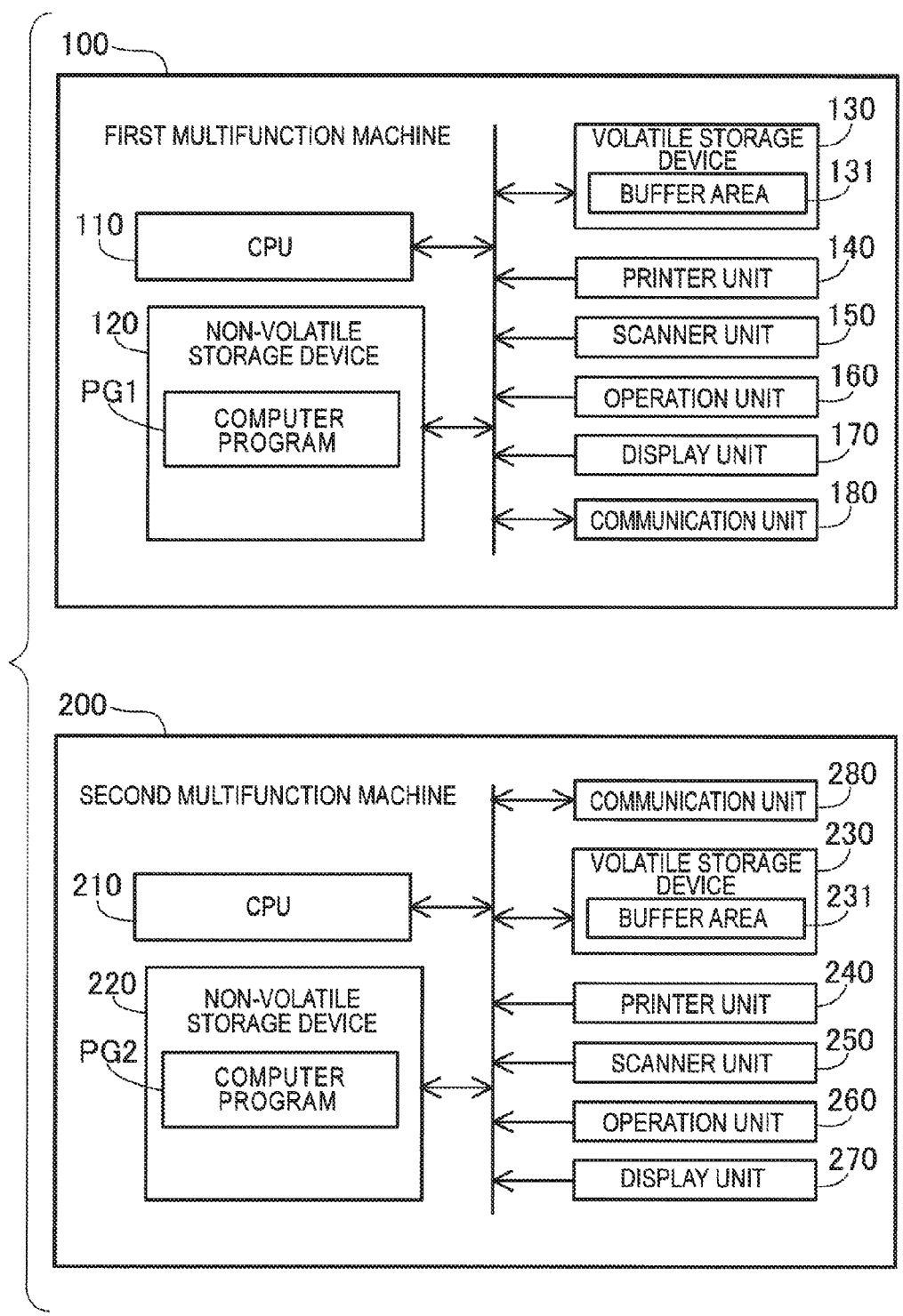
FIG. 1 is a block diagram illustrating configurations of a second multifunction machine 200 and a first multifunction machine 100.

In the below, illustrative embodiments of this disclosure will be described with reference to the drawings. FIG. 1 is a block diagram illustrating configurations of a second multifunction machine 200, which is an image processing apparatus of an illustrative embodiment, and a first multifunction machine 100, which is other image processing apparatus.

The second multifunction machine 200 includes a CPU 210 serving as a controller of the second multifunction machine 200, a non-volatile storage device 220 such as a hard disk drive and an EEPROM, a volatile storage device 230 such as a RAM, a printer unit 240 configured to print an image by a predetermined method (for example, an inkjet method and a laser method), a scanner unit 250, an operation unit 260 such as a touch panel and a button, a display unit 270 such as a liquid crystal panel overlapped with the touch panel, and a communication unit 280 including an interface for performing data communication with an external apparatus such as a user's terminal apparatus and a USB memory (not shown).

The scanner unit 250 is a reading device configured to optically read a document with an image sensor, thereby generating scan data, for example. The scan data is RGB image data, which represents a color of each pixel by an RGB value including gradation values (for example, 256 gradations of 0 to 255) of three color components of RGB. The gradation values of the three color components of RGB are also referred to as an R value, a G value and a B value, respectively.

The non-volatile storage device 220 is configured to store therein a computer program PG2. The computer program PG2 is stored in advance in the non-volatile storage device 220 upon the manufacturing of the second multifunction machine 200. Instead, the computer program PG2 may be stored in a CD-ROM, a DVD-ROM and the like, or may be downloaded from a server (not shown) connected to the second multifunction machine 200 through a network. The volatile storage device 230 is provided with a buffer area 231 configured to temporarily store therein a variety of intermediate data, which is generated when the CPU 210 performs processing.

The CPU 210 is configured to execute the computer program PG2, thereby implementing a function of entirely controlling the second multifunction machine 200 and a function of executing plurality of types of correction processing (which will be described later) for the scan data.

A model of the first multifunction machine 100 is different from a model of the second multifunction machine 200. In this illustrative embodiment, a manufacturer of the first multifunction machine 100 is different from a manufacturer of the second multifunction machine 200.

Similarly to the second multifunction machine 200, the first multifunction machine 100 includes a CPU 110, a non-volatile storage device 120, a volatile storage device 130, a printer unit 140, a scanner unit 150, an operation unit 160, a display unit 170 and a communication unit 180. In the non-volatile storage device 120, a computer program PG1 is stored. The scanner unit 150 is a reading device configured to optically read a document, thereby generating scan data. The scan data generated by the scanner unit 150 is the same RGB image data as the scan data generated by the scanner unit 250.

A-2: Correction Processing:

In this illustrative embodiment, the CPU 210 of the second multifunction machine 200 can execute plurality of types of correction processing for the scan data, which is a processing target. The plurality of types of correction processing includes background removal processing, ghosting removal processing, overall brightness correction processing and contrast correction processing. The background removal processing and the ghosting removal processing are processing of correcting a background color in an image. Also, the overall brightness correction processing and the contrast correction processing are processing of correcting brightness of an image.

Figure 2:
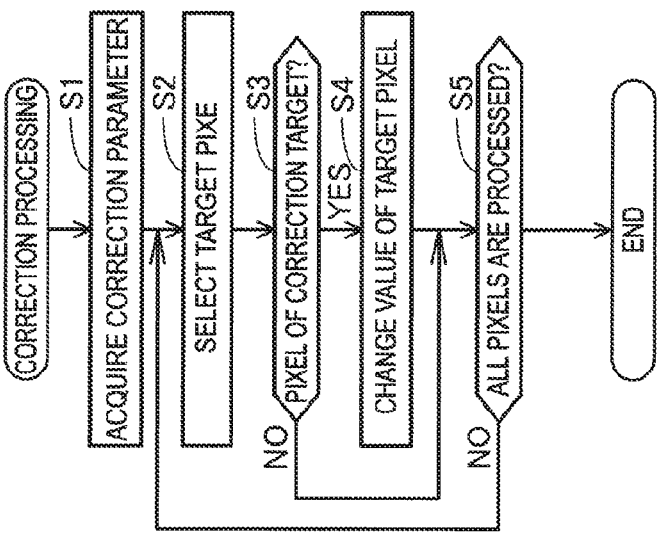
FIG. 2 is a flowchart and a table illustrating an outline of correction processing.

FIG. 2 is a flowchart and a table illustrating an outline of the correction processing. In S1, the CPU 210 acquires a correction parameter corresponding to a type of the correction processing. Here, the correction parameter is a setting value relating to the correction processing, which can be changed in response to a user's instruction. As shown in the table of FIG. 2, when the correction processing to be executed is the background removal processing, there is no correction parameter. When the correction processing to be executed is the ghosting removal processing, the overall brightness correction processing or the contrast correction processing, the correction parameter is correction levels L2, L3, L4, respectively. The correction levels L2, L3, L4 are represented by integers within a predetermined range, for example. For instance, the correction level L2 of the ghosting removal processing is represented by an integer of 0 to +20. For example, the correction level L3 of the overall brightness correction processing and the correction level L4 of the contrast correction processing are respectively represented by an integer of −10 to +10. The greater absolute value of the integer indicative of the correction levels L2 to L4 indicates the higher correction level.

In S2, the CPU 210 selects one target pixel from plurality of pixels in the scan image represented by the scan data of the processing target. In S3, the CPU 210 determines whether the target pixel is a pixel of a correction target.

When the correction processing to be executed is the background removal processing, a color value (in this illustrative embodiment, the RGB value) in a background-approximate range RA1 approximate to a background color of the scan image is the pixel of the processing target. In this illustrative embodiment, the background-approximate range RA1 is a range having a specific width $\Delta V1$ with a center on a background color value (Rg, Gg, Bg), which is the RGB value indicative of the background color. The specific width $\Delta V1$ is a fixed value. For example, in this illustrative embodiment, the background-approximate range RA1 is a range of the RGB values satisfying conditions of (Rg−ΔV1)≤R≤(Rg+ΔV1), (Gg−ΔV1)≤G≤(Gg+ΔV1) and (Bg−ΔV1)≤B≤(Bg+ΔV1). As the background color value (Rg, Gg, Bg), for example, a color value indicated by the most frequent values Rm, Gm, Bm of the R values, the G values and the B values of the plurality of pixels in the scan image is used ((Rg, Gg, Bg)=(Rm, Gm, Bm)).

When the correction processing to be executed is the ghosting removal processing, a color value in a background-approximate range RA2 approximate to the background color of the scan image is the pixel of the processing target. In this illustrative embodiment, the background-approximate range RA2 is a range having a specific width ΔV2 with a center on the background color value (Rg, Gg, Bg). Therefore, the background-approximate range RA2 is a range similar to the background-approximate range RA1, for example, a range of the RGB values satisfying (Rg−ΔV2)≤R≤(Rg+ΔV2), (Gg−ΔV2)≤G≤(Gg+ΔV2) and (Bg−ΔV2)≤B≤(Bg+ΔV2). Meanwhile, the specific width ΔV2 of the background-approximate range RA2 is not a fixed value but a value to be varied depending on the correction level L2. For example, the specific width ΔV2 is set to be a larger value when the correction level L2 is higher, and is represented by ΔV2=L2×K (K: a predetermined coefficient), for example.

When the correction processing to be executed is the overall brightness correction processing or the contrast correction processing, all pixels in the scan image are pixels of the processing target.

In S3 of FIG. 2, when the target pixel is the pixel of the correction target (S3: YES), in S4, the CPU 210 changes a color value (Rt, Gt, Bt) of the target pixel. When the target pixel is not the pixel of the correction target (S3: NO), the color value (Rt, Gt, Bt) of the target pixel is not changed.

When the correction processing to be executed is the background removal processing, in S4, the color value (Rt, Gt, Bt) of the target pixel is changed to a white value (Rwh, Gwh, Bwh), which is a specific color value indicative of a specific color different from the background color, in this illustrative embodiment, white (for example, (Rwh, Gwh, Bwh)=(255, 255, 255)).

When the correction processing to be executed is the ghosting removal processing, in S4, the color value (Rt, Gt, Bt) of the target pixel is changed to a representative color of the background based on the values of the pixels in the background, in this illustrative embodiment, the most frequent value (Rm, Gm, Bm) used as the background color value (Rg, Gg, Bg).

When the correction processing to be executed is the overall brightness correction processing, in S4, the color value (Rt, Gt, Bt) of the target pixel is changed to a color value (Ra3, Ga3, Ba3) in accordance with a tone curve C3 for overall brightness correction, for example. That is, the color value (Ra3, Ga3, Ba3) after the conversion is a value that is to be obtained by converting the color value (Rt, Gt, Bt) of the target pixel for each component value by using the tone curve C3.

When the correction processing to be executed is the contrast correction processing, in S4, the color value (Rt, Gt, Bt) of the target pixel is changed to a color value (Ra4, Ga4, Ba4) in accordance with a tone curve C4 for overall brightness correction, for example. That is, the color value (Ra4, Ga4, Ba4) after the conversion is a value that is to be obtained by converting the color value (Rt, Gt, Bt) of the target pixel for each component value by using the tone curve C4.

Figure 3A:
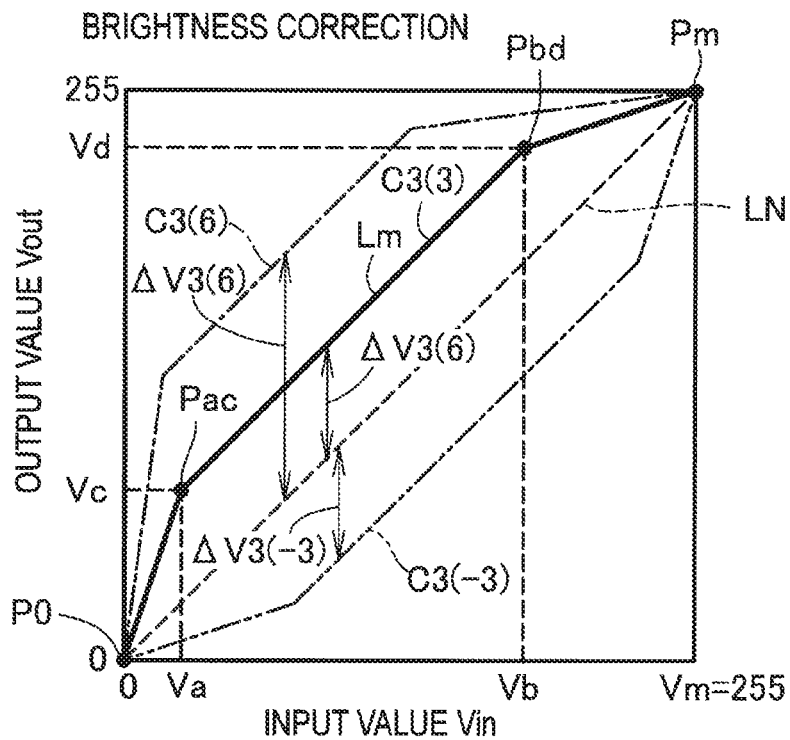
FIGS. 3A and 3B illustrate examples of a tone curve.
Figure 3B:
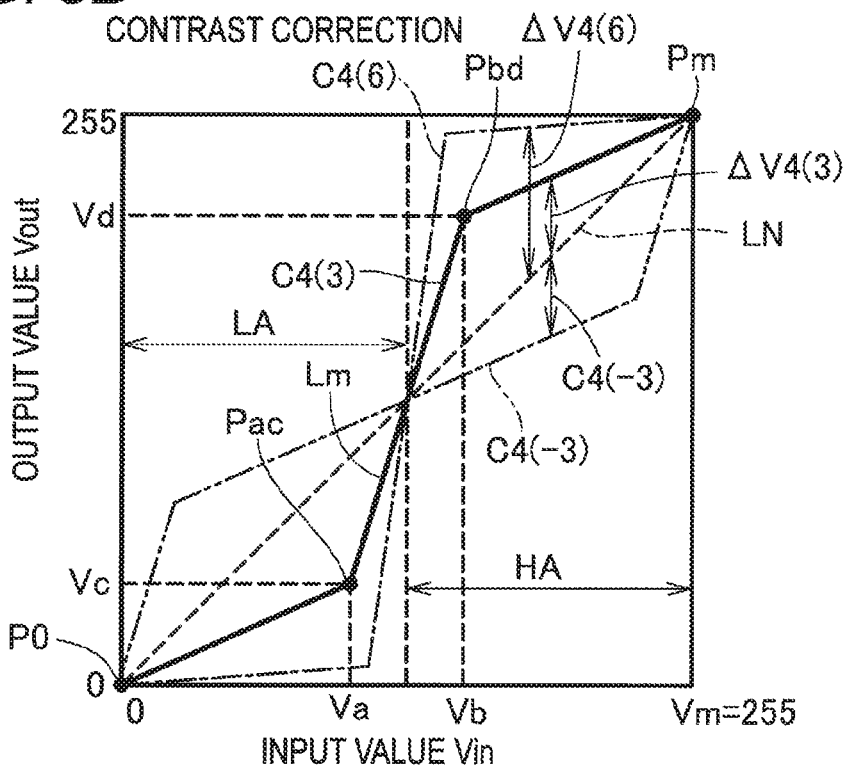

FIG. 3 illustrates an example of the tone curve. In FIG. 3A, as an example of the tone curve C3 for overall brightness correction, three tone curves C3(3), C3(6), C3(−3) of which the correction levels L3 are different are shown. In FIG. 3B, as an example of the tone curve C4 for contrast correction, three tone curves C4(3), C4(6), C4(−3) of which the correction levels L4 are different are shown. In the meantime, the numbers in the parentheses of the tone curves are indicative of the correction levels L3, L4. Each of the curves defines a correspondence relation between an input gradation value Vin and an output gradation value Vout in a coordinate system in which a horizontal axis is an input gradation value Vin and a vertical axis is an output gradation value Vout. The tone curves are expressed by following equations (1) to (3).

$$V\text{out}=(Vc/Va)\times V\text{in} \quad (0\leq V\text{in}<Va) \tag{1}$$

$$V\text{out}=(V\text{in}-Va)\times\{(Vd-Vc)/(Vb-Va)\}+Vc \quad (Va\leq V\text{in}<Vb) \tag{2}$$

$$V\text{out}=(V\text{in}-Vb)\times\{(Vm-Vd)/(Vm-Vb)\}+Vd \quad (Vb\leq V\text{in}\leq Vm) \tag{3}$$

Here, Vm indicates a maximum value of the gradation value, and in this illustrative embodiment, Vm=255. Va to Vd are parameters defining a shape of the tone curve. In FIG. 3A, the parameters Va to Vd defining the tone curve C3(3) of the overall brightness correction are shown, and in FIG. 3B, the parameters Va to Vd defining the tone curve C4(3) of the contrast correction are shown.

The parameters Va, Vc set a position of a first point Pac of the tone curve, and the parameters Vb, Vd set a position of a second point Pbd of the tone curve. In this illustrative embodiment, the tone curve is a line straightly connecting a start point P0 (0, 0), the first point Pac (Va, Vc), the second point Pbd (Vb, Vd) and an end point Pm (Vm, Vm).

In the overall brightness correction processing, as shown for the tone curve C3(3) in FIG. 3A, both the first point Pac and the second point Pbd are positioned at the same side, as seen from a non-conversion line (a line LN connecting the start point P0 and the end point Pm in FIG. 3). Also, a line Lm connecting the first point Pac and the second point Pbd is parallel with the non-conversion line.

In the overall brightness correction processing, when the correction level L3 is a positive value, the correction of increasing the overall brightness of an image is performed. When the correction level L3 is a negative value, the correction of decreasing the overall brightness of an image is performed. Accordingly, when the correction level L3 is a positive value, like the tone curves C3(3), C3(6), the first point Pac and the second point Pbd are arranged above the non-conversion line LN, so that the tone curve C3 has an upwardly convex shape as a whole. When the correction level L3 is a negative value, like the tone curve C3(−3), the first point Pac and the second point Pbd are arranged below the non-conversion line LN, so that the tone curve C3 has a downwardly convex shape as a whole.

Also, the first point Pac and the second point Pbd are set so that the higher the correction level L3, i.e., the greater the absolute value of the correction level L3, a correction amount ΔV3 becomes greater. For example, the correction amount ΔV3(6) of the tone curve C3(6) of FIG. 3A is about twice as great as the correction amounts ΔV3(3), ΔV3(−3) of the tone curves C3(3), C3(−3), respectively.

In the contrast correction processing, as shown for the tone curve C4(3) of FIG. 3B, the first point Pac is positioned at one side, with respect to the non-conversion line LN, and the second point Pbd is positioned at the other side, with respect to the non-conversion line LN. The line Lm connecting the first point Pac and the second point Pbd intersects with a central point of the non-conversion line LN.

In the contrast correction processing, when the correction level L4 is a positive value, the correction of increasing the contrast of an image, i.e., the correction of increasing a difference of the brightness between a relatively dark area and a relatively bright area in an image is performed. Also, when the correction level L4 is a negative value, the correction of decreasing the contrast of an image, i.e., the correction of decreasing a difference of the brightness between a relatively dark area and a relatively bright area in an image is performed. Accordingly, when the correction level L4 is a positive value, like the tone curves C4(3), C4(6), the first point Pac positioned in a low gradation-side area LA is arranged below the non-conversion line LN, and the second point Pbd positioned in a high gradation-side area HA is arranged above the non-conversion line LN. When the correction level L4 is a negative value, like the tone curve C4(−3), the first point Pac positioned in the low gradation-side area LA is arranged above the non-conversion line LN, and the second point Pbd positioned in the high gradation-side area HA is arranged below the non-conversion line LN. The high gradation-side area HA is a range (for example, 128 to 255) of values of an intermediate value (for example, 128) or greater of a range (for example, 0 to 255) of the gradation values. The low gradation-side area LA is a range (for example, 0 to 128) of values smaller than the intermediate value of the range of the gradation values.

Also, the first point Pac and the second point Pbd are set so that the higher the correction level L4, i.e., the greater the absolute value of the correction level L4, the correction amount ΔV4 becomes greater. For example, the correction amount ΔV4(6) of the tone curve C4(6) of FIG. 3B is about twice as great as the correction amounts ΔV4(3), ΔV4(−3) of the tone curves C4(3), C4(−3).

In S5 of FIG. 2, the CPU 210 determines whether all the pixels in the image of the processing target have been processed as the target pixel. When there is a non-processed pixel (S5: NO), the CPU 410 returns to S2 and selects the non-processed pixel as the target pixel. When all the pixels have been processed (S5: YES), the CPU 210 terminates the correction processing.

In the meantime, the CPU 110 of the first multifunction machine 100 of this illustrative embodiment can execute four types of correction processing, which correspond to the four types of correction processing that is executable by the second multifunction machine 200, for the scan data. Each of the four types of correction processing that is executable by the CPU 110 of the first multifunction machine 100 is processing capable of accomplishing the equivalent result to the corresponding processing of the four types of correction processing that is executable by the second multifunction machine 200, and is expressed by the same name (for example, the background removal processing, the ghosting removal processing and the like), in the below.

A-3. Operations of Second Multifunction Machine 200

In this illustrative embodiment, a case is assumed in which a user of the first multifunction machine 100 switches the multifunction machine being used from the first multifunction machine 100 to the second multifunction machine 200. Currently, the user enables the first multifunction machine 100 to generate the scan data and also enables the first multifunction machine 100 to execute the correction processing for the scan data.

The second multifunction machine 200 can execute correction information registration processing for reducing a user's trouble on the setting of the second multifunction machine 200. The correction information registration processing is to support the user's setting on the second multifunction machine 200 so that the correction processing capable of accomplishing the equivalent result to the correction processing, which is to be executed by the CPU 110 of the first multifunction machine 100, can be executed by the second multifunction machine 200.

A-3-1. Preparation of Image Data for Analysis and the Like

Before executing the correction information registration processing by the second multifunction machine 200, the user prepares, as image data for analysis, original image data and corrected image data.

FIG. 4 illustrates an example of the original image and the corrected image. An original image IA of FIG. 4A is an image represented by the original image data. The original image data is RGB image data generated by optically reading a document OP1 with the scanner unit 150 of the first multifunction machine 100. FIG. 4A illustrates not only the original image IA but also the document OP1.

The document OP1 is a document where an image including an object Ob1 including characters Tx1 and an object Ob2 including figures is printed on a sheet having a background color (for example, light red or blue) different from white, for example. Therefore, the original image IA includes a background GA having the background color of the sheet at parts except for the objects Ob1, Ob2. In the meantime, the background GA includes a ghosting OF. The ghosting OF is an image that is included in the original image IA as an image of a backside of the document OP1 is unintentionally read when reading a surface of the document OP1 with the scanner unit 150. In general, the ghosting OF is an image having a color approximate to the color of the background GA.

The corrected image data is generated when the CPU 110 of the first multifunction machine 100 executes specific correction processing for the original image data. For example, when the user wants the second multifunction machine 200 to execute the correction processing, which is equivalent to the specific correction processing being executed by the first multifunction machine 100, the user prepares the corrected image data generated as the specific correction processing is executed for the original image data. As a corrected image IB expressed by the corrected image data, corrected images IB1 to IB4 to be described later may be exemplified.

For example, first corrected image data, which is generated as the background removal processing is executed for the original image data, may be prepared. The first corrected image IB1 of FIG. 4B expressed by the first corrected image data includes the objects Ob1, Ob2 and a background GB1 of which color has been changed to white. In the background GB1 of which color has been changed to white, the ghosting OF is not included. The reason is that since the ghosting OF has a color approximate to the color of the background GA, the colors of the plurality of pixels configuring the ghosting OF have been changed to the white value by the background removal processing.

Also, second corrected image data, which is generated as the ghosting removal processing is executed for the original image data, may be prepared. The second corrected image IB2 of FIG. 4C expressed by the second corrected image data includes the objects Ob1, Ob2 and a background GB2. The background GB2 has the same color as the background GA of the original image IA but does not include the ghosting OF. The reason is that the colors of the plurality of pixels configuring the ghosting OF have been changed to the background color value by the ghosting removal processing.

Also, third corrected image data, which is generated as the overall brightness correction processing is executed for the original image data, and fourth corrected image data, which is generated as the contrast correction processing is executed for the original image data, may be prepared. The third corrected image IB3 expressed by the third corrected image data and the fourth corrected image IB4 expressed by the fourth corrected image data are omitted.

For example, the user stores the original image data and the corrected image data, which was previously generated by the first multifunction machine 100, from the non-volatile storage device 120 of the first multifunction machine 100 or a terminal such as a PC and a smart phone into a removable memory such as a USB memory.

In this way, the original image data and the corrected image data are generated by the first multifunction machine 100 different from the second multifunction machine 200 serving as the image processing apparatus of this illustrative embodiment.

A-3-2. Correction Information Registration Processing

In the correction information registration processing, the original image data and the corrected image data are analyzed to perform the setting on the second multifunction machine 200 so that the specific correction processing being executed for the original image data can be executed by the second multifunction machine 200. The correction information registration processing is executed by the CPU 210 of the second multifunction machine 200 when an execution instruction from the user is input through the operation unit 260, for example. For instance, the user inputs an execution instruction at a state where the removable memory, in which the original image data and the corrected image data are stored, is connected to the communication unit 280 of the second multifunction machine 200.

Figure 5:
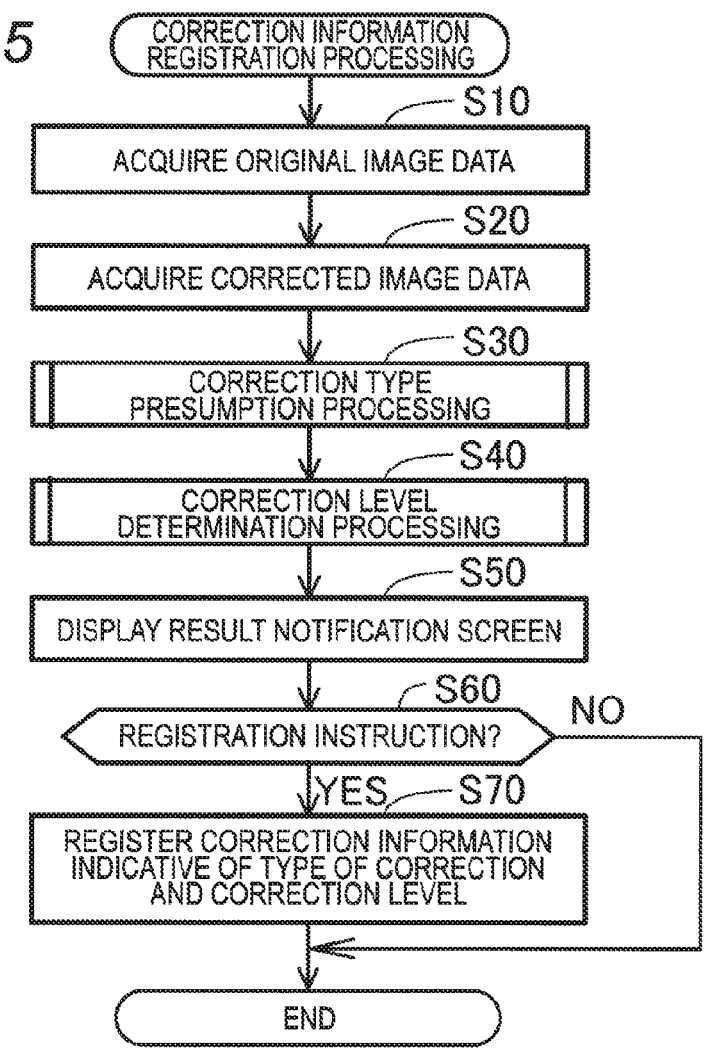
FIG. 5 is a flowchart of correction information registration processing.

FIG. 5 is a flowchart of the correction information registration processing. In S10, the CPU 210 acquires the original image data from the removable memory connected to the communication unit 280 and stores the same in the buffer area 231. In S20, the CPU 210 acquires the corrected image data from the removable memory and stores the same in the buffer area 231.

In S30, the CPU 210 executes correction type presumption processing by using the original image data and the corrected image data. In the correction type presumption processing, a first index value relating to a color distribution of the original image IA and a second index value relating to a color distribution of the corrected image IB are calculated, and processing corresponding to the specific correction processing executed for the original image data is presumed from plural types of candidates for processing, based on comparison of the index values. In this illustrative embodiment, plural types of candidates for processing is the four types of correction processing that is executable by the second multifunction machine 200. The correction type presumption processing will be described in detail later.

In S40, the CPU 210 executes correction level determination processing by using the original image data and the corrected image data. In the correction level determination processing, the correction levels L2 to L4, which are the correction parameters for the correspondence processing presumed in the correction type presumption processing, are determined. As described in detail later, the correction level is determined using a method corresponding to the presumed correspondence processing. However, when the presumed correspondence processing is the background removal processing, the correction level determination processing is not performed because there is no correction level, as described above.

Figure 6:
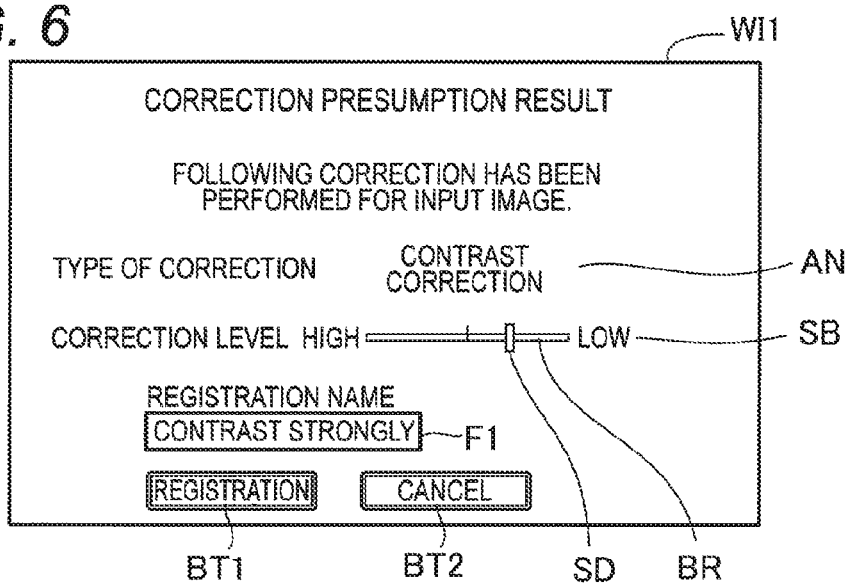
FIG. 6 illustrates an example of a result notification screen WI1.

In S50, the CPU 210 displays a result notification screen WI1, which is a user interface (UI) screen for notifying the user of a presumption result, on the display unit 270. FIG. 6 illustrates an example of the result notification screen WI1. The result notification screen WI1 includes a text AN indicative of the presumed correspondence processing, a slide bar SB indicating the determined correction level, and a field F1 for inputting a registration name of correction information.

In this illustrative embodiment, the text AN indicates any one of the background removal processing, the ghosting removal processing, the overall brightness correction processing and the contrast correction processing.

The slide bar SB is a UI element for designating the correction level. The slide bar SB includes a bar BR and a slider SD configured to move along the bar BR in accordance with an operation of the user. The slider SD may be moved to any one of predetermined number (for example, 20) of positions along the bar BR, for example. Each of the predetermined number of moveable positions corresponds to each of the settable correction levels one-on-one. For example, in the example of FIG. 6, a position of the predetermined number of positions, which is closer to a right end of the bar BR, corresponds to a higher correction level, and a position closer to a left end of the bar BR corresponds to a lower correction level.

When the result notification screen WI1 is displayed, the slider SD is arranged at a position corresponding to a correction level determined in the correction level determination processing. Thereby, the user is notified of the determined correction level. The user can adjust the correction level by moving the slider SD to a position corresponding to a desired correction level. That is, the user can input an adjustment instruction of the correction level through the result notification screen WI1. The CPU 210 adjusts the correction level, based on the user's adjustment instruction. As a result, it is possible to adjust the automatically determined correction level, based on the user's instruction, so that it is possible to determine an appropriate correction level without placing an excessive trouble on the user.

In S60, the CPU 210 determines whether a registration instruction of the correction information is input through the result notification screen WI1. For example, when the user presses a registration button BT1, it is determined that a registration instruction is input, and when the user presses a cancel button BT2, it is determined that a registration instruction is not input.

When a registration instruction is input (S60: YES), in S70, the CPU 210 registers the correction information, which includes a correction level corresponding to a position of the slider SD at the time of the input of the registration instruction and the information indicative of one of the four types of correction processing, in the non-volatile storage device 220 in association with the registration name, and terminates the correction information registration processing. As the registration name, a text input in the field F1 at the time of the input of the registration instruction is used. When a registration instruction is not input (S60: NO), the CPU 210 skips over S70, and terminates the correction information registration processing.

The correction information registration processing can be executed several times by changing the combination of the original image data and the corrected image data into a combination of two other image data, for example, in response to the execution instruction of the user. In this case, the correction information is determined and registered for each of combinations of plurality of sets. For example, the plurality of correction information may be registered for each of plurality of types of documents.

According to the above-described registration processing, the correspondence processing to the specific correction processing is presumed based on the comparison of the first index value relating to the color distribution of the original image IA and the second index value relating to the color distribution of the corrected image IB (S40 in FIG. 5). As a result, it is possible to appropriately presume which of plural types of candidates for processing that is executable by the image processing apparatus corresponds to the specific correction processing, which has been executed for the original image data, according to the color distribution of the original image IA and the color distribution of the corrected image IB, corresponds. As a result, for example, it is possible to notify the user of the presumed correction processing or to automatically execute the presumed correction processing, so that it is possible to reduce the trouble of the user who uses the correction processing.

More specifically, it may not be easy for the user to manually set, on the UI screen, the correction processing to be executed at the second multifunction machine 200 so that the equivalent processing result to the correction processing executed at the first multifunction machine 100 can be obtained. For example, the names of the correction processing that are to be used in the UI screen may be different depending on the multifunction machines. For example, the ghosting removal processing may also be referred to as 'color clean up.' Also, the configuration of the UI screen, the sequence of displaying the UI screen and the like are different depending on the multifunction machines. In particular, like a case where the different correction processing is respectively performed for each of the plurality of types of documents, it may be necessary to register plurality of correction information, so that the user's trouble increases. In this illustrative embodiment, since the processing corresponding to the correction processing that is being executed by the first multifunction machine 100 is automatically presumed from the plurality of candidate processing that can be executed by the second multifunction machine 200, it is possible to reduce the user's trouble of making a setting (for example, registration of the correction information) relating to the correction processing at the second multifunction machine 200.

Further, the correction level, which is the parameter for the presumed correspondence processing, is determined using the method corresponding to the presumed correspondence processing (S40). As a result, it is possible to automatically determine the correction level appropriately. Therefore, it is possible to reduce the user's trouble to set the correction level of the correction processing at the second multifunction machine 200. For example, the relation between the values of the correction levels L2, L3, L4 and the specific width $\Delta V2$, the correction amount $\Delta V3$, $\Delta V4$ may be different depending on the multifunction machines, for example. Accordingly, it cannot be said that it is easy for the user to set the appropriate correction level at the second multifunction machine 200 so that the processing result equivalent to the correction processing executed at the first multifunction machine 100 can be obtained. In particular, as described above, when it is necessary to register the plurality of correction information, for example, the user's trouble increases. In this illustrative embodiment, since it is possible to determine the correction level by using the method corresponding to the presumed correspondence processing, it is possible to automatically determine the appropriate correction level easily. Therefore, it is possible to reduce the user's trouble to set the correction level at the second multifunction machine 200.

Further, in S50, the result notification screen WI1 is displayed, so that the presumed correspondence processing is notified to the user. As a result, it is possible to reduce the user's trouble. Specifically, the user can easily register the presumed correspondence processing in the second multifunction machine 200. Also, since the user can recognize the processing corresponding to the correction processing that can be executed by the first multifunction machine 100 previously used, it is possible to easily enrich the understanding about the second multifunction machine 200 without referring to the manual and the like.

Also, since the presumed correction level is notified to the user on the result notification screen WI1, the user's trouble is further reduced. Specifically, the user can easily register the correction information indicative of the presumed correspondence processing and the correction level in the second multifunction machine 200. Also, since the user can recognize the correction level corresponding to the correction level set at the first multifunction machine 100 previously used, it is possible to easily enrich the understanding about the second multifunction machine 200.

A-3-3. Correction Type Presumption Processing

Figure 7:
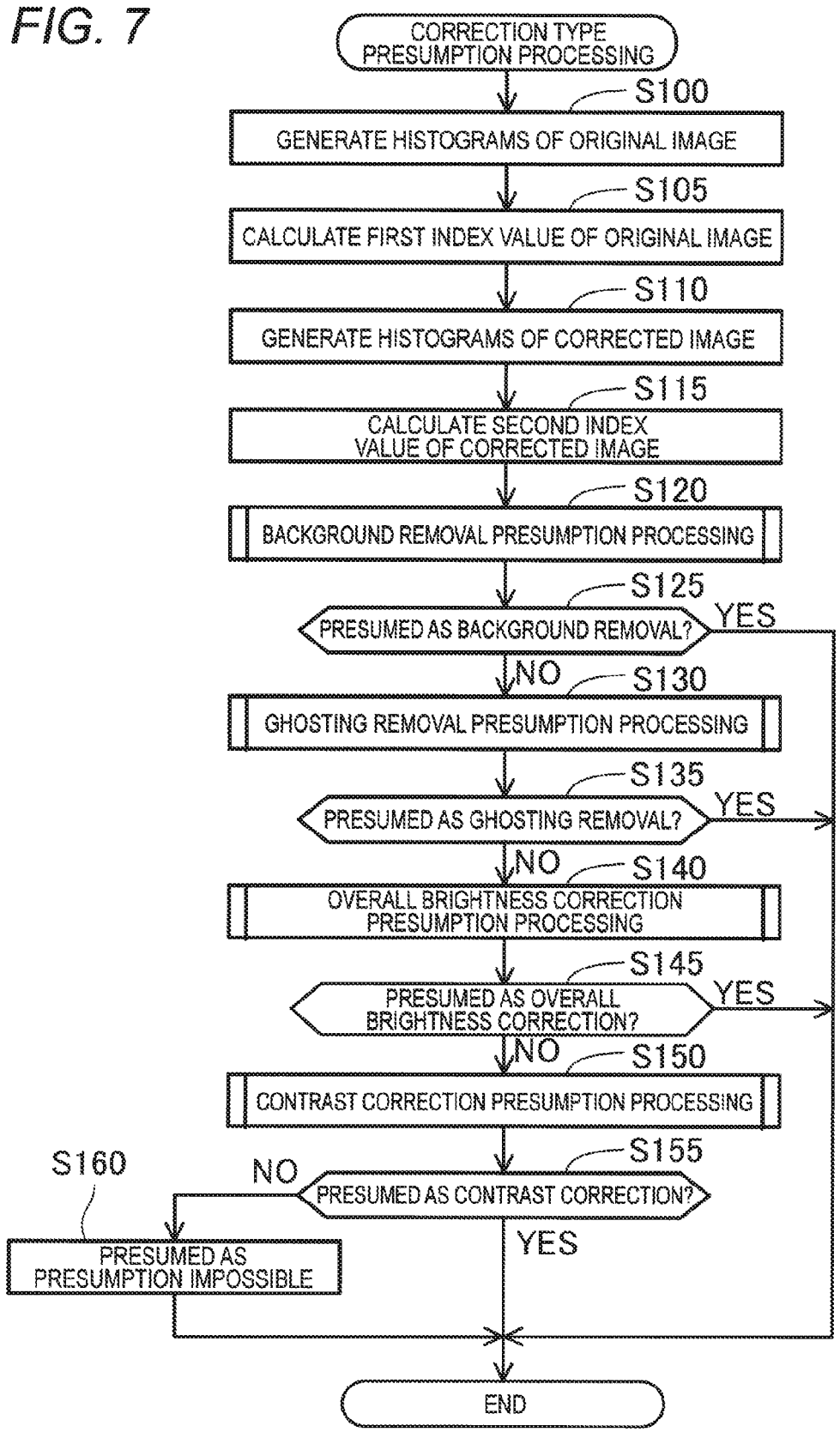
FIG. 7 is a flowchart of correction type presumption processing.

The correction type presumption processing of S30 in FIG. 5 will be described. FIG. 7 is a flowchart of the correction type presumption processing. In S100, a histogram indicative of a color distribution of the original image IA is generated by using the original image data. The histogram is data obtained by classifying the respective pixels of the original image data into plurality of classes according to the RGB values of the pixels. In this illustrative embodiment, each of the gradation values of 256 gradations is set to one class and the histogram is generated for each of the three color components of the RGB value.

FIG. 8 illustrates examples of the histogram of the original image IA and the distribution area of the original image IA. In FIG. 8A, the histogram of the original image IA is shown for each of the three color components of RGB. The histograms are simplified for illustration.

The three histograms include peaks PBr, PBg, PBb corresponding to the background GA and peaks POr, POg, POb corresponding to the objects Ob1, Ob2 in the original image IA of FIG. 4A, respectively. The gradation value at a position of the peak is also referred to as a peak gradation value.

In S105, the CPU 210 calculates the first index value relating to the color distribution of the original image IA. In this illustrative embodiment, as the first index value, for each of the three color components, the most frequent value Rm, Gm, Bm, number of pixels (also referred to as number of most frequent pixels) RmN, GmN, BmN having the most frequent value Rm, Gm, Bm, an opposite-side most frequent value Ro, Go, Bo, and a width Rw, Gw, Bw of the distribution area are calculated. It can be said that number of most frequent pixels RmN, GmN, BmN is a peak height corresponding to the most frequent value. The opposite-side most frequent value Ro of the R component is the most frequent value in an area of the high gradation-side area HA and the low gradation-side area LA, which is opposite to an area in which the most frequent value Rm of the R component exists. The opposite-side most frequent values Go, Bo of the G and B components are also the same.

As shown in FIG. 8A, in a general image, the most frequent values Rm, Gm, Bm are the peak gradation values of the peaks PBr, PBg, PBb corresponding to the background GA. The reason is that since the background GA is usually more uniform and wider, as compared to the objects Ob1, Ob2, the peaks PBr, PBg, PBb corresponding to the background GA become the highest peaks in the histograms of the respective color components. The opposite-side most frequent values Ro, Go, Bo are the peak gradation values of the peaks POr, POg, POb corresponding to the objects Ob1, Ob2, for example.

The width Rw of the distribution area of the R component is a width of a range of the gradation values of the pixels, which are equal to or greater than a reference number THn, of the 256 gradation values of the R component. The reference number THn corresponds to 3% of a total number of pixels in an image, for example. In FIG. 8A, the reference number THn is indicated by a horizontal dotted line. In FIG. 8B, the distribution areas RDo, RDb, GDo, GDb, BDo, BDb of the gradation values has number of the pixels equal to or greater than the reference number THn. In the example of FIG. 8B, the width Rw of the distribution area of the R component is a sum value of the widths Rw1, Rw2 of the two distribution areas RDo, RDb (Rw=Rw1+Rw2). The widths Gw, Bw of the distribution areas of the G and B components are also the same.

In S110 of FIG. 7, a histogram indicative of a color distribution of the corrected image IB is generated by using the corrected image data. Similarly to the histograms of the original image IA of FIG. 8, a histogram is generated for each of the three color components of the RGB value.

FIGS. 9 and 10 illustrate examples of the histogram of the corrected image IB. FIG. 11 illustrates examples of the distribution area of the corrected image IB. In FIGS. 9A and 9B, the histograms of the first corrected image IB1, which are generated by using the first corrected image data, and the histograms of the second corrected image IB2, which are generated by using the second corrected image data, are shown. In FIGS. 10A and 10B, the histograms of the third corrected image IB3, which are generated by using the third corrected image data, and the histograms of the fourth corrected image IB4, which are generated by using the fourth corrected image data, are shown. Also, in FIG. 11, the distribution areas of the corrected images IB1 to IB4 are respectively shown. The histogram and the distribution area are different depending on which the corrected image data the corrected image data of the processing target corresponds to, i.e., depending on which of the background removal processing, the ghosting removal processing, the overall brightness correction processing and the contrast correction processing the specific correction processing is executed for the original image data.

The generated histogram of each color component includes the peak corresponding to the background and the peak corresponding to the objects, like the histogram in the original image IA of FIG. 4A. For example, the three histograms of the first corrected image IB1 shown in FIG. 9A include the peaks PBr1, PBg1, PBb1 corresponding to the background GB1 (FIG. 4B) and the peaks POr1, POg1, POb1 corresponding to the objects Ob1, Ob2, respectively. Meanwhile, in the histograms of FIGS. 9 and 10, the peak indicated by the dotted line is the peak of the histogram of the original image IA shown in FIG. 8A, and is shown for comparison with the peak of the histogram of the corrected image IB.

In S115, the CPU 210 calculates the second index value relating to the color distribution of the corrected image IB. In this illustrative embodiment, as the second index value, for each of the three color components, the most frequent value, number of most frequent pixels, the opposite-side most frequent value, and the width of the distribution area are calculated, like the first index value. For example, when the corrected image data of the processing target is the first image data, as the second index value, the most frequent values Rm1, Gm1, Bm1, the numbers of most frequent pixels RmN1, GmN1, BmN1, the opposite-side most frequent values Ro1, Go1, Bo1, and the widths Rw1, Gw1, Bw1 of the distribution area are calculated (FIG. 9A, FIG. 11A). Meanwhile, in FIG. 11, the distribution area indicated by the dotted line is the distribution area of the original image IA shown in FIG. 8A, and is shown for comparison with the distribution area of the corrected image IB.

In S120 of FIG. 7, the CPU 210 executes the background removal presumption processing of presuming whether the correspondence processing to the specific correction processing executed for the original image data is the background removal processing by using the calculated first index value and second index value. In S125, the CPU 210 determines whether the correspondence processing is presumed as the background removal processing, based on a result of the background removal presumption processing. When the correspondence processing is presumed as the background removal processing (S125: YES), the correction type presumption processing is terminated, and when the correspondence processing is presumed not as the background removal processing (S125: NO), the CPU 210 proceeds to S130.

In S130, the CPU 210 executes the ghosting removal presumption processing of presuming whether the correspondence processing to the specific correction processing is the ghosting removal processing by using the calculated first index value and second index value. In S135, the CPU 210 determines whether the correspondence processing is presumed as the ghosting removal processing, based on a result of the ghosting removal presumption processing. When the correspondence processing is presumed as the ghosting removal processing (S135: YES), the correction type presumption processing is terminated, and when the correspondence processing is presumed not as the ghosting removal processing (S135: NO), the CPU 210 proceeds to S140.

In S140, the CPU 210 executes the overall brightness correction presumption processing of presuming whether the correspondence processing to the specific correction processing is the overall brightness correction processing by using the calculated first index value and second index value. In S145, the CPU 210 determines whether the correspondence processing is presumed as the overall brightness correction processing, based on a result of the overall brightness correction presumption processing. When the correspondence processing is presumed as the overall brightness correction processing (S145: YES), the correction type presumption processing is terminated, and when the correspondence processing is presumed not as the overall brightness correction processing (S145: NO), the CPU 210 proceeds to S150.

In S150, the CPU 210 executes the contrast correction presumption processing of presuming whether the correspondence processing to the specific correction processing is the contrast correction processing by using the calculated first index value and second index value. In S155, the CPU 210 determines whether the correspondence processing is presumed as the contrast correction processing, based on a result of the contrast correction presumption processing. When the correspondence processing is presumed as the contrast correction processing (S155: YES), the correction type presumption processing is terminated, and when the correspondence processing is presumed not as the contrast correction processing (S155: NO), the CPU 210 determines that the correspondence processing cannot be presumed, and terminates the correction type presumption processing, in S150.

According to the above-described correction type presumption processing, the histograms of the original image IA are generated by using the original image data (S100), and the first index value is calculated by using the histograms (S105). The histograms of the corrected image IB are generated by using the corrected image data (S110), and the second index value is calculated by using the histograms (S115). The processing of presuming the correspondence processing is performed using the first index value and the second index value (S120, S130, S140, S150). As a result, since it is possible to compare the two images with high precision by using the histograms of the original image IA and the histograms of the corrected image IB, it is possible to appropriately presume the correspondence processing.

A-3-4. Background Removal Presumption Processing

Figure 12:
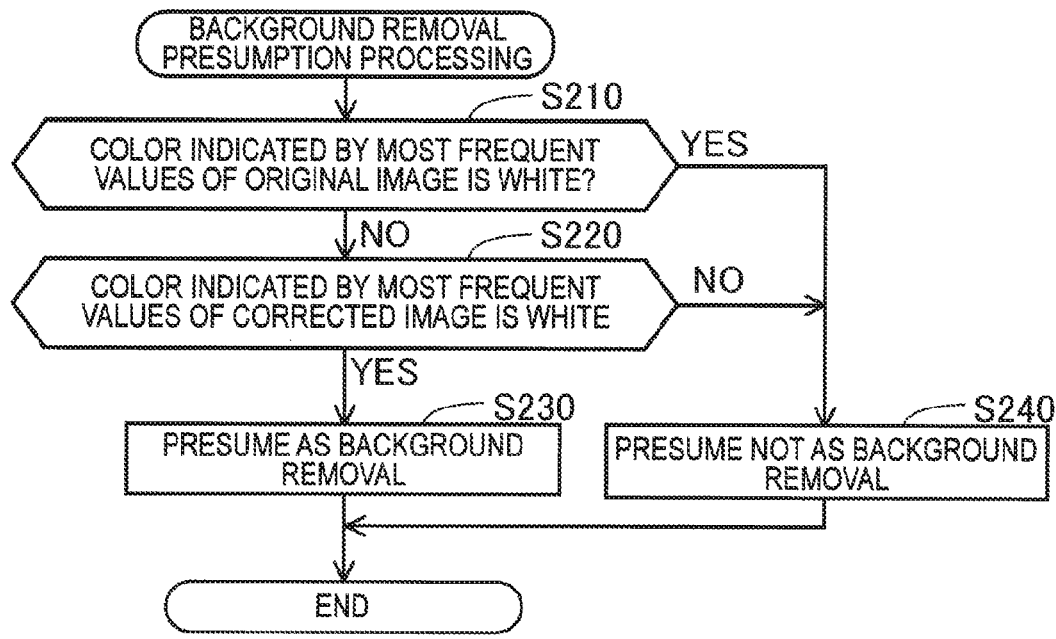
FIG. 12 is a flowchart of background removal presumption processing.

The background removal presumption processing of S120 in FIG. 7 will be described. FIG. 12 is a flowchart of the background removal presumption processing. In S210, the CPU 210 determines whether the color indicated by the most frequent values of the original image IA is white. Specifically, it is determined whether the RGB value (Rm, Gm, Bm) including the most frequent values Rm, Gm, Bm is the white value (255, 255, 255). Instead, the color value for which it is determined as white may be provided with a width and it may be determined whether the RGB value (Rm, Gm, Bm) is within the range indicative of the white, for example, the range of (250 to 255, 250 to 255, 250 to 255). As described above, the RGB value (Rm, Gm, Bm) including the most frequent values Rm, Gm, Bm is considered as the background color value indicative of the color of the background GA of the original image IA. Therefore, it can be said that it is determined in S210 whether the color of the background GA of the original image IA is white. For example, in the example of FIG. 4A, since the color of the background GA of the original image IA is not white, the RGB value (Rm, Gm, Bm) is not the white value (255, 255, 255), as shown in FIG. 8A. In this case, therefore, it is determined in S210 that the color indicated by the most frequent values Rm, Gm, Bm of the original image IA is not white.

When it is determined that the color indicated by the most frequent values Rm, Gm, Bm of the original image IA is not white (S210: NO), the CPU 210 determines whether the color indicated by the most frequent values of the corrected image IB is white, in S220. For example, when the first corrected image data is the processing target, since the RGB value (Rm1, Gm1, Bm1) including the most frequent values Rm1, Gm1, Bm1 is the white value (255, 255, 255), as shown in FIG. 9A, it is determined that the color indicated by the most frequent values of the first corrected image IB1 is white. On the other hand, when the second corrected image data is the processing target, since the RGB value (Rm2, Gm2, Bm2) including the most frequent values Rm2, Gm2, Bm2 is not the white value (255, 255, 255), as shown in FIG. 9B, it is determined that the color indicated by the most frequent values of the second corrected image IB2 is not white. It can be said that it is determined in S220 whether the background color of the corrected image IB is white.

When the color indicated by the most frequent values of the corrected image IB is white (S220: YES), the CPU 210 presumes in S230 that the correspondence processing is the background removal processing.

When the color indicated by the most frequent values Rm, Gm, Bm of the original image IA is white (S210: YES), or when the color indicated by the most frequent values of the corrected image IB is not white (S220: NO), the CPU 210 presumes in S240 that the correspondence processing is not the background removal processing.

According to the above-described background removal presumption processing of this illustrative embodiment, when the background color value of the original image IA, specifically, the color value including the most frequent values indicates the color different from the specific color (white, in this illustrative embodiment) (S210: NO) and the background color value of the corrected image IB indicates the specific color (S220: YES), the correspondence processing is presumed as the background removal processing. As a result, it is possible to appropriately presume whether the correspondence processing is the background removal processing by using the most frequent value, which is the representative value of the image indicating the background color. For example, in the background removal processing, even when the background of the original image IA has a color different from white, the background of the corrected image IB becomes white. In contrast, in the ghosting removal processing, the contrast correction processing and the overall brightness correction processing, when the background of the original image IA has a color different from white, the background of the corrected image IB is not white. In this way, by the background removal presumption processing, it is possible to precisely presume whether the correspondence processing is the background removal processing.

A-3-5. Ghosting Removal Presumption Processing

Figure 13:
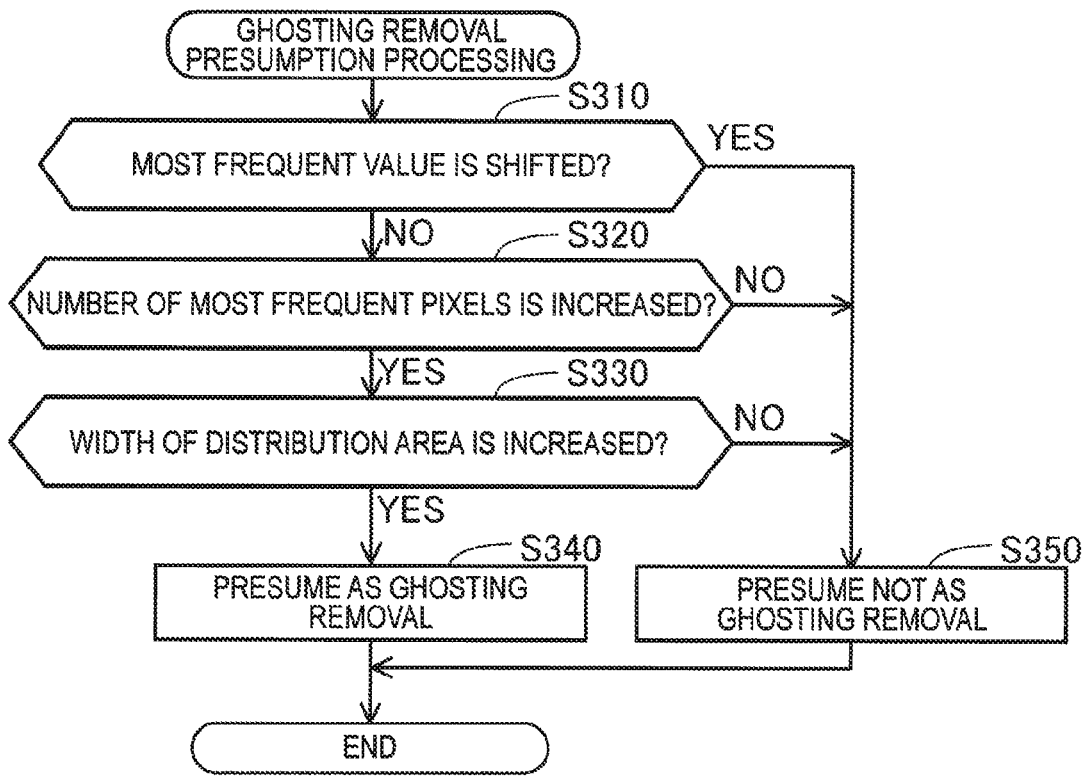
FIG. 13 is a flowchart of ghosting removal presumption processing.

The ghosting removal presumption processing of S130 in FIG. 7 will be described. FIG. 13 is a flowchart of the ghosting removal presumption processing. In S310, the CPU 210 determines whether the most frequent value of the corrected image IB is shifted with respect to the most frequent value of the original image IA.

In this illustrative embodiment, when a first value V1 and a second value V2 satisfy a shift condition, the CPU 210 determines that the second value V2 is shifted with respect to the first value V1, and when the first value V1 and the second value V2 do not satisfy a shift condition, the CPU 210 determines that the second value V2 is not shifted with respect to the first value V1. The shift condition is that an absolute value |V1−V2| of a difference between the first value V1 and the second value V2 is greater than a threshold THs for shift determination (|V1−V2|>THs). The threshold THs for shift determination is '5', for example, when the range of the values, which can be taken as the first value V1 and the second value V2, is 0 to 255.

In S310, when the most frequent value of the original image IA and the most frequent value of the corrected image IB satisfy the shift condition for each of the three color components, it is determined that the most frequent value of the corrected image IB is shifted with respect to the most frequent value of the original image IA. When the most frequent value of the original image IA and the most frequent value of the corrected image IB do not satisfy the shift condition for any one of the three color components, it is determined that the most frequent value of the corrected image IB is not shifted with respect to the most frequent value of the original image IA.

For example, when the second corrected image data is the processing target, it is determined that the most frequent values Rm2, Gm2, Bm2 of the second corrected image IB2 are not shifted, as can be seen from FIG. 9B. On the other hand, when the first corrected image data is the processing target, it is determined that the most frequent values Rm1, Gm1, Bm1 of the first corrected image IB1 are shifted, as can be seen from FIG. 9A.

When it is determined that the most frequent value of the corrected image IB is not shifted with respect to the most frequent value of the original image IA (S310: NO), the CPU 210 determines whether number of most frequent pixels of the corrected image IB is increased with respect to number of most frequent pixels of the original image IA, in S320. Specifically, when a difference obtained by subtracting number of most frequent pixels of the original image IA from number of most frequent pixels of the corrected image IB is equal to or greater than a threshold THi for each of the three color components, it is determined that number of most frequent pixels of the corrected image IB is increased with respect to number of most frequent pixels of the original image IA. When the difference obtained by subtracting number of most frequent pixels of the original image IA from number of most frequent pixels of the corrected image IB is smaller than the threshold THi for any one of the three color components, it is determined that number of most frequent pixels of the corrected image IB is not increased with respect to number of most frequent pixels of the original image IA. The threshold THi is a value equal to or twice as great as number of most frequent pixels of the original image IA, for example. Accordingly, when number of most frequent pixels of the corrected image IB is remarkably increased with respect to number of most frequent pixels of the original image IA by two or three times or greater, it is determined in S320 that number of most frequent pixels of the corrected image IB is increased.

For example, when the second corrected image data is the processing target, the peak heights corresponding to the most frequent values are higher than the original image data for all the color components, as can be seen from FIG. 9B. Accordingly, in this case, it is determined that number of most frequent pixels of the corrected image IB is increased with respect to number of most frequent pixels of the original image IA.

When it is determined that number of most frequent pixels of the corrected image IB is increased with respect to number of most frequent pixels of the original image IA (S320: YES), the CPU 210 determines whether the width of the distribution area of the corrected image IB is reduced with respect to the width of the distribution area of the original image IA, in S330.

In this illustrative embodiment, when a width W1 of a first distribution area and a width W2 of a second distribution area satisfy a reduction condition for one color component, the CPU 210 determines that the width W2 of the second distribution area is reduced with respect to the width W1 of the first distribution area for the color component, and the width W1 of the first distribution area and the width W2 of the second distribution area do not satisfy a reduction condition, the CPU 210 determines that the width W2 of the second distribution area is not reduced with respect to the width W1 of the first distribution area. The reduction condition is that a difference (W1−W2) obtained by subtracting the width W2 of the second distribution area from the width W1 of the first distribution area is greater than a threshold Thw for width determination ((W1−W2)>THw). The threshold Thw for width determination is '5', for example, when the range of the values, which can be taken as the gradation value of each component of RGB, is 0 to 255.

In S330, when the width of the distribution area is reduced for each of the three color components, it is determined that the width of the distribution area of the corrected image IB is reduced with respect to the width of the distribution area of the original image IA. When the width of the distribution area is not reduced for any one of the three color components, it is determined that the width of the distribution area of the corrected image IB is not reduced with respect to the width of the distribution area of the original image IA.

For example, when the second corrected image data is the processing target, the widths Rwb2, Gwb2, Bwb2 of the distribution areas corresponding to the background of the second corrected image IB2 are considerably reduced with respect to the widths Rwb, Gwb, Bwb of the distribution areas corresponding to the background of the original image IA, as can be seen from FIGS. 8B and 11B. Accordingly, in this case, it is determined in S330 that the width of the distribution area of the corrected image IB is reduced with respect to the width of the distribution area of the original image IA.

When the width of the distribution area of the corrected image IB is reduced with respect to the width of the distribution area of the original image IA (S330: YES), the CPU 210 presumes in S340 that the correspondence processing is the ghosting removal processing.

When the most frequent value of the corrected image IB is shifted with respect to the most frequent value of the original image IA (S310: YES), when number of most frequent pixels of the corrected image IB is not increased with respect to number of most frequent pixels of the original image IA (S320: NO), or when the width of the distribution area of the corrected image IB is not reduced with respect to the width of the distribution area of the original image IA (S330: NO), the CPU 210 presumes in S350 that the correspondence processing is not the ghosting removal processing.

According to the above-described ghosting removal presumption processing of this illustrative embodiment, when the background color value of the corrected image IB is not shifted with respect to the background color value (specifically, the color value including the most frequent value) of the original image IA (S310: NO), number of pixels having the background color of the corrected image IB is increased with respect to number of pixels (specifically, number of most frequent pixels) having the background color of the original image IA (S320: YES) and the width of the distribution area of the corrected image IB is reduced with respect to the width of the distribution area of the original image IA (S330: YES), the correspondence processing is presumed as the ghosting removal processing. As a result, it is possible to appropriately presume whether the correspondence processing is the background removal processing by using the most frequent value, which is the representative value of the image indicative of the background color, number of most frequent pixels and the width of the distribution area. For example, while the background color value is shifted in the background removal processing, the contrast correction processing and the overall brightness correction processing (FIGS. 9A, 10A, 10B), the background color value is not shifted in the ghosting removal processing (FIG. 9B). Also, while number of most frequent pixels is not remarkably increased in the contrast correction processing and the overall brightness correction processing, number of most frequent pixels is considerably increased in the ghosting removal processing. Also, while the width of the distribution area is little changed in the overall brightness correction processing, the width of the distribution area is reduced in the background removal processing. In this way, it is possible to precisely presume whether the correspondence processing is the ghosting removal processing by the ghosting removal presumption processing.

Also, as can be seen from the descriptions of the background removal presumption processing and the ghosting removal presumption processing, in this illustrative embodiment, the correspondence processing is presumed by using, the respective most frequent values of the original image IA and the corrected image IB. It is considered that the most frequent value is indicative of the background color in the image. Accordingly, according to this illustrative embodiment, it is possible to appropriately presume the correspondence processing from plural types of candidates for processing (for example, the background removal processing and the ghosting removal processing) of correcting the background color.

A-3-6. Overall Brightness Correction Presumption Processing

Figure 14:
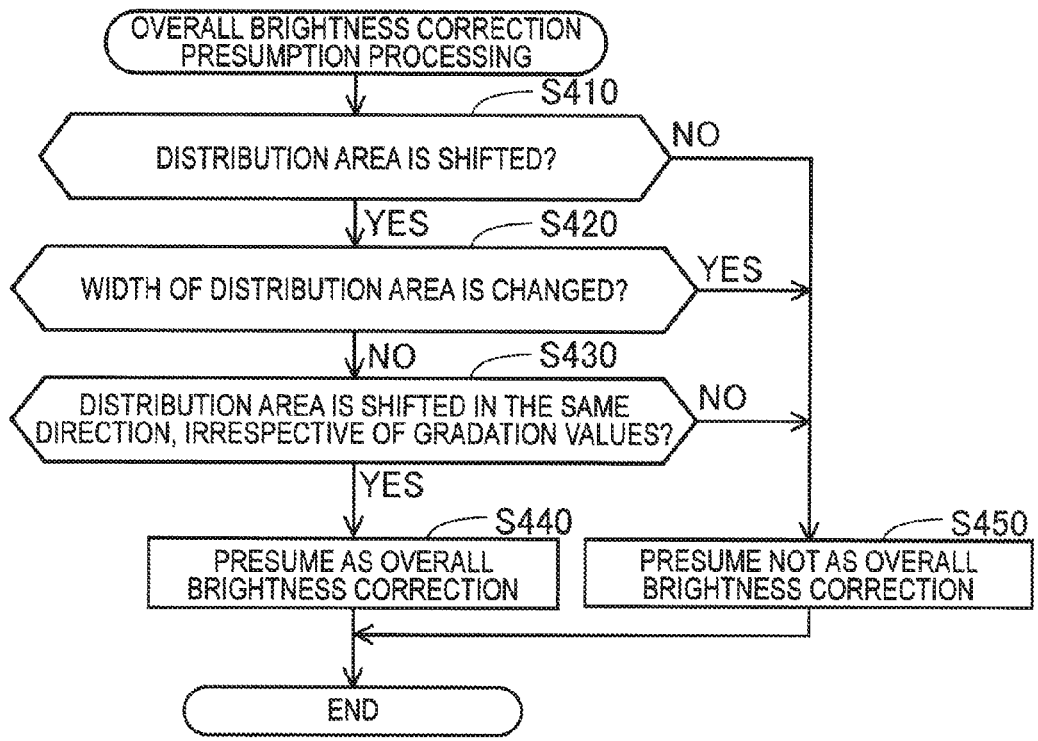
FIG. 14 is a flowchart of overall brightness correction presumption processing.

The overall brightness correction presumption processing of S140 in FIG. 7 will be described. FIG. 14 is a flowchart of the overall brightness correction presumption processing. In S410, the CPU 210 determines whether the distribution area of the corrected image IB is shifted with respect to the distribution area of the original image IA. For example, when the most frequent value of the corrected image IB is shifted with respect to the most frequent value of the original image IA and the opposite-side most frequent value of the corrected image IB is shifted with respect to the opposite-side most frequent value of the original image IA, it is determined that the distribution area of the corrected image IB is shifted with respect to the distribution area of the original image IA. At this time, when the most frequent values Rm, Gm, Bm of the original image IA are the maximum value (255, in this illustrative embodiment) of the range of values that can be taken as the gradation value, since the most frequent values are not shifted in the positive direction, if the opposite-side most frequent values are shifted, it may be determined that the distribution area of the corrected image IB is shifted.

For example, when the third corrected image data is the processing target, as can be seen from FIG. 11C, the corresponding distribution areas RDo3, RDb3, GDo3, GDb3, BDo3, BDb3 of the third corrected image IB3 are shifted with respect to the respective distribution areas RDo, RDb, GDo, GDb, BDo, BDb of the original image IA. Accordingly, as can be seen from FIG. 10A, the most frequent values Rm3, Gm3, Bm3 of the third corrected image IB3 are shifted with respect to the most frequent values Rm, Gm, Bm of the original image IA and the opposite-side most frequent values Ro3, Go3, Bo3 of the third corrected image IB3 are also shifted with respect to the opposite-side most frequent values Ro, Go, Bo of the original image IA. Therefore, when the third corrected image data is the processing target, it is determined that the distribution area of the corrected image IB is shifted.

For example, when the second corrected image data is the processing target, as can be seen from FIG. 11B, the corresponding distribution areas RDo2, GDo2, BDo2 of the second corrected image IB2 are not shifted with respect to the distribution areas RDo, GDo, BDo corresponding to the object of the original image IA. Accordingly, when the second corrected image data is the processing target, it is determined that the distribution area of the corrected image IB is not shifted.

When it is determined that the distribution area of the corrected image IB is shifted with respect to the distribution area of the original image IA (410: YES), the CPU 210 determines whether the width of the distribution area of the corrected image IB is changed with respect to the width of the distribution area of the original image IA, in S420.

In this illustrative embodiment, when the width W1 of the first distribution area and the width W2 of the second distribution area satisfy a change condition for one color component, the CPU 210 determines that the width W2 of the second distribution area is changed with respect to width W1 of the first distribution area for the color component, and when the width W1 of the first distribution area and the width W2 of the second distribution area do not satisfy a change condition, the CPU 210 determines that the width W2 of the second distribution area is not changed with respect to width W1 of the first distribution area. The change condition is that an absolute value |W1−W2| of a difference between the width W1 of the first distribution area and the width W2 of the second distribution area is smaller than the threshold THw for width determination (|W1−W2|<THw).

In S420, when the width of the distribution area is not changed for each of the three color components, it is determined that the width of the distribution area of the corrected image IB is not changed with respect to the width of the distribution area of the original image IA. When the width of the distribution area is changed for any one of the three color components, it is determined that the width of the distribution area of the corrected image IB is changed with respect to the width of the distribution area of the original image IA.

For example, when the third corrected image data is the processing target, as can be seen from FIGS. 8B and 11C, the widths Rw3, Gw3, Bw3 of the distribution area corresponding to the background of the third corrected image IB3 are not changed with respect to the widths Rw, Gw, Bw of the distribution area of the original image IA. Accordingly, in this case, it is determined in S420 that the width of the distribution area of the corrected image IB is not changed with respect to the width of the distribution area of the original image IA.

When the width of the distribution area of the corrected image IB is not changed with respect to the width of the distribution area of the original image IA (S420: NO), the CPU 210 determines whether the distribution area of the corrected image IB is shifted with respect to the distribution area of the original image IA in the same direction, irrespective of the gradation values, in S430. For example, when it is possible to determine that the shift direction of the low gradation-side area LA and the shift direction of the high gradation-side area HA are the same, it is determined that the distribution area of the corrected image IB is shifted in the same direction, irrespective of the gradation values. In this illustrative embodiment, when the shift direction of the corresponding most frequent values of the corrected image IB with respect to the most frequent values Rm, Gm, Bm of the original image IA is the same as the shift direction of the corresponding opposite-side most frequent values of the corrected image IB with respect to the opposite-side most frequent values Ro, Go, Bo of the original image IA, the CPU 210 determines that the distribution area of the corrected image IB is shifted in the same direction, irrespective of the gradation values. Since the most frequent value and the opposite-side most frequent value are respectively positioned at one side and other side of the low gradation-side area LA and the high gradation-side area HA, it is possible to appropriately determine whether the distribution area of the corrected image IB is shifted in the same direction, irrespective of the gradation values, by using the shift directions of the most frequent value and the opposite-side most frequent value.

For example, when the third corrected image data is the processing target, as shown in FIG. 10A, the most frequent values Rm3, Gm3, Bm3 and the opposite-side most frequent values Ro3, Go3, Bo3 of the third corrected image IB3 are shifted in the same direction (the rightward direction in FIG. 10A). Accordingly, when the third corrected image data is the processing target, it is determined that the distribution area of the corrected image IB is shifted in the same direction, irrespective of the gradation values.

When the distribution area of the corrected image IB is shifted in the same direction, irrespective of the gradation values (S430: YES), the CPU 210 presumes in S440 that the correspondence processing is the overall brightness correction processing.

When the distribution area of the corrected image IB is not shifted with respect to the distribution area of the original image IA (S410: NO), when the width of the distribution area of the corrected image IB is changed with respect to the width of the distribution area of the original image IA (S420: YES), or when the distribution area of the corrected image IB is not shifted in the same direction (S430: NO), the CPU 210 presumes in S450 that the correspondence processing is not the overall brightness correction processing.

According to the above-described overall brightness correction presumption processing of this illustrative embodiment, when the most frequent value and the opposite-side most frequent value as the corresponding representative values of the corrected image IB are shifted in the same direction shifted with respect to each of the most frequent value and the opposite-side most frequent value as a plurality of representative values of the original image IA (S430: YES) and the width of the distribution area of the corrected image IB is not changed with respect to the width of the distribution area of the original image IA (S420: NO), the correspondence processing is presumed as the overall brightness correction processing. As a result, it is possible to appropriately determine whether the correspondence processing is the overall brightness correction processing by using the plurality of representative values and the widths of the distribution areas of the original image IA and the corrected image IB.

In case of the background removal processing, for example, while the distribution area of the high gradation-side area HA corresponding to the background is shifted, the distribution area of the low gradation-side area LA corresponding to the object is not shifted (FIGS. 9A and 11A). Also, in case of the ghosting removal processing, neither the distribution area corresponding to the background nor the distribution area corresponding to the object is shifted (FIGS. 9B and 11B). Also, in the contrast correction processing, the distribution area in the low gradation-side area LA and the high gradation-side area HA are shifted in the opposite directions (FIGS. 10B and 11D). In contrast, in the overall brightness correction processing, the distribution area in the low gradation-side area LA and the high gradation-side area HA are shifted in the same direction shifted (FIGS. 10A and 11C).

Also, in the overall brightness correction processing, the width of the distribution area is not changed. The reason will be described. When a gradient of the tone curve (FIG. 3) used for the correction is '1', the width of the distribution area is not changed by the correction. On the other hand, when the gradient of the tone curve (FIG. 3) is less than 1, the width of the distribution area is reduced by the correction, and when the gradient is greater than 1, the width of the distribution area is increased by the correction. In the overall brightness correction processing, since an average gradient of the tone curve is substantially '1', the width of the distribution area is little changed by the correction. For example, for the tone curve C3(3) of FIG. 3A used in the overall brightness correction processing of this illustrative embodiment, the gradient is greater than 1 in the range of $0 \leq \text{Vin} < \text{Va}$, is 1 in the range of $\text{Va} \leq \text{Vin} < \text{Vb}$ and is less than 1 in the range of $\text{Vb} \leq \text{Vin} < \text{Vm}$. Therefore, it can be seen that the average gradient of the tone curve C3(3) is substantially '1.'

In this way, it is possible to precisely presume whether the correspondence processing is the overall brightness correction processing by the overall brightness correction presumption processing.

A-3-7. Contrast Correction Presumption Processing

Figure 15:
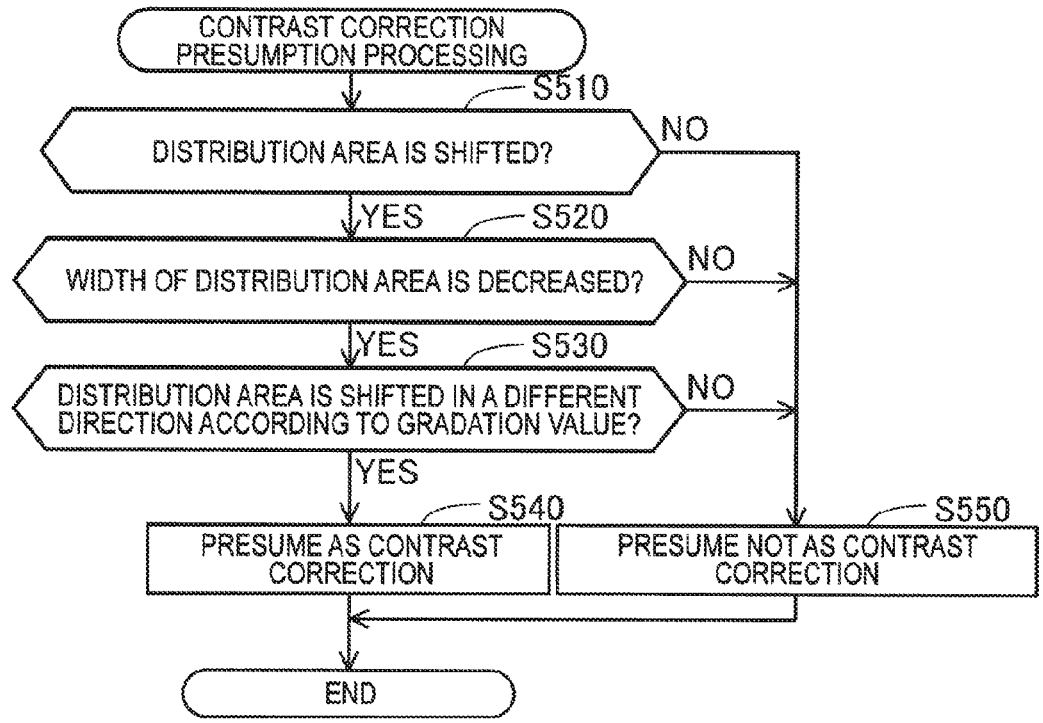
FIG. 15 is a flowchart of contrast correction presumption processing.

The contrast correction presumption processing of S150 in FIG. 7 will be described. FIG. 15 is a flowchart of the contrast correction presumption processing. In S510, the CPU 210 determines whether the distribution area of the corrected image IB is shifted with respect to the distribution area of the original image IA. Since this determination is the same as the determination in S410 of FIG. 14, the determination result in S410 of FIG. 14 is used as it is.

When the distribution area of the corrected image IB is shifted with respect to the distribution area of the original image IA (510: YES), the CPU 210 determines whether the width of the distribution area of the corrected image IB is reduced with respect to the width of the distribution area of the original image IA, in S520. Since this determination is the same as the determination in S330 of FIG. 13, the determination result in S330 of FIG. 13 is used as it is.

When the width of the distribution area of the corrected image IB is reduced with respect to the width of the distribution area of the original image IA (S520: YES), the CPU 210 determines whether the distribution area of the corrected image IB is shifted with respect to the distribution area of the original image IA in a different direction according to the gradation value, in S530. For example, when it is possible to determine that the shift direction of the low gradation-side area LA is opposite to the shift direction of the high gradation-side area HA, it is determined that the distribution area of the corrected image IB is shifted in a different direction according to the gradation value. In this illustrative embodiment, when the shift direction of the corresponding most frequent values of the corrected image IB with respect to the most frequent values Rm, Gm, Bm of the original image IA is opposite to the shift direction of the corresponding opposite-side most frequent values of the corrected image IB with respect to the opposite-side most frequent values Ro, Go, Bo of the original image IA, the CPU 210 determines that the distribution area of the corrected image IB is shifted in a different direction according to the gradation value. Since the most frequent value and the opposite-side most frequent value are respectively positioned at one side and other side of the low gradation-side area LA and the high gradation-side area HA, it is possible to appropriately determine whether the shift direction of the low gradation-side area LA is opposite to the shift direction of the high gradation-side area HA by using the shift directions of the most frequent value and the opposite-side most frequent value.

For example, when the fourth corrected image data is the processing target, the most frequent values Rm4, Gm4, Bm4 of the fourth corrected image IB4 are rightwards shifted and the opposite-side most frequent values Ro4, Go4, Bo4 are leftwards shifted, as shown in FIG. 10B. Accordingly, when the fourth corrected image data is the processing target, it is determined that the distribution area of the corrected image IB is shifted in a different direction according to the gradation value.

When the distribution area of the corrected image IB is shifted in a different direction according to the gradation value (S530: YES), the CPU 210 presumes in S540 that the correspondence processing is the contrast correction processing.

When the distribution area of the corrected image IB is not shifted with respect to the distribution area of the original image IA (S510: NO), when the width of the distribution area of the corrected image IB is not reduced with respect to the width of the distribution area of the original image IA (S520: NO), or when the distribution area of the corrected image IB is not shifted in the different direction according to the gradation value (S530: NO), the CPU 210 presumes in S550 that the correspondence processing is not the contrast correction processing.

According to the above-described contrast correction presumption processing of this illustrative embodiment, when the opposite-side most frequent value as the representative value in the length of the low gradation-side area LA of the corrected image IB is shifted in a first direction (the leftward direction in the example of FIG. 10B) with respect to the opposite-side most frequent value as the corresponding representative value of the original image IA, the most frequent value as the representative value in the high gradation-side area HA of the corrected image IB is shifted in second direction (the rightward direction in the example of FIG. 10B), which is opposite to the first direction, with respect to the most frequent value as the corresponding representative value of the original image IA (S530: YES), and the width of the distribution area of the corrected image IB is reduced with respect to the width of the distribution area of the original image IA (S520: YES), the correspondence processing is presumed as the contrast correction processing. As a result, it is possible to appropriately presume whether the correspondence processing is the contrast correction processing by using the plurality of representative values and the distribution width values of the original image IA and the corrected image IB.

In case of the background removal processing, for example, while the distribution area of the high gradation-side area HA corresponding to the background is shifted, the distribution area of the low gradation-side area LA corresponding to the object is not shifted (FIGS. 9A and 11A). Also, in case of the ghosting removal processing, neither the distribution area corresponding to the background nor the distribution area corresponding to the object is shifted (FIGS. 9B and 11B). Also, in the overall brightness correction processing, the distribution area in the low gradation-side area LA and the distribution area in the high gradation-side area HA are shifted in the same direction (FIGS. 10A and 11C). In contrast, in the contrast correction processing, the distribution area in the low gradation-side area LA and the distribution area in the high gradation-side area HA are shifted in the opposite directions (FIGS. 10B and 11D).

Also, while the width of the distribution area is not changed in the overall brightness correction processing, the width of the distribution area may be reduced in the contrast correction processing. The reason will be described. The tone curve of the contrast correction processing has a relatively wide part in which the gradient is less than 1. For example, for the tone curve C4(3) of FIG. 3B used for the contrast correction processing of this illustrative embodiment, a range ($0 \leq Vin < Va$, $Vb \leq Vin < Vm$) in which the gradient is less than 1 is wider than a range ($Va \leq Vin < Vb$) in which the gradient is greater than 1. Also, for the tone curve C4(−3) of FIG. 3B, a range ($Va \leq Vin < Vb$) in which the gradient is less than 1 is wider than a range ($0 \leq Vin < Va$, $Vb \leq Vin < Vm$) in which the gradient is greater than 1. Accordingly, in the contrast correction processing, the width of the distribution area may be reduced, unlike the overall brightness correction processing. Meanwhile, in this illustrative embodiment, the condition for presuming that the correspondence processing is the contrast correction includes a condition 'the width of the distribution area is reduced'. However, the condition may not include a condition 'the width of the distribution area is reduced.' However, in general, when the contrast correction processing is performed, the width of the distribution area is reduced in many cases. Therefore, like this illustrative embodiment, when the condition 'the width of the distribution area is reduced' is included in the presumption condition, it is possible to improve the presumption precision.

In this way, it is possible to precisely presume whether the correspondence processing is the contrast correction processing by the above-described contrast correction presumption processing.

Also, as can be seen from the descriptions of the overall brightness correction presumption processing and the contrast correction presumption processing, in this illustrative embodiment, for each of the plurality of representative values (for example, the most frequent value and the opposite-side most frequent value) of the original image IA, the correspondence processing is presumed by using, the direction in which the plurality of corresponding representative values of the corrected image IB is shifted. In the processing of correcting the brightness of the image such as the overall brightness correction processing and the contrast correction processing, the distribution area in the image is shifted according to the type of the correction. Accordingly, according to this illustrative embodiment, it is possible to appropriately presume the correspondence processing from plural types of candidates for processing (for example, the overall brightness correction presumption processing and the contrast correction presumption processing) of correcting the brightness of the image.

Also, as can be seen from the descriptions of the four types of the presumption processing, in this illustrative embodiment, as the first index value and the second index value, the representative values (for example, the three most frequent values of the three color components) of the plurality of pixel values in the image, number of representative pixels (for example, number of most frequent pixels) indicative of number of pixels having the representative values and the widths of the distribution areas are calculated, and the correspondence processing is presumed based on the shifts of the representative values between the original image IA and the corrected image IB, the increase or decrease of number of representative pixels, and the increase or decrease of the widths of the distribution areas. As a result, based on the representative values, number of representative pixels and the widths of the distribution areas, it is possible to precisely presume the correspondence processing.

A-3-8. Correction Level Determination Processing

Figure 16:
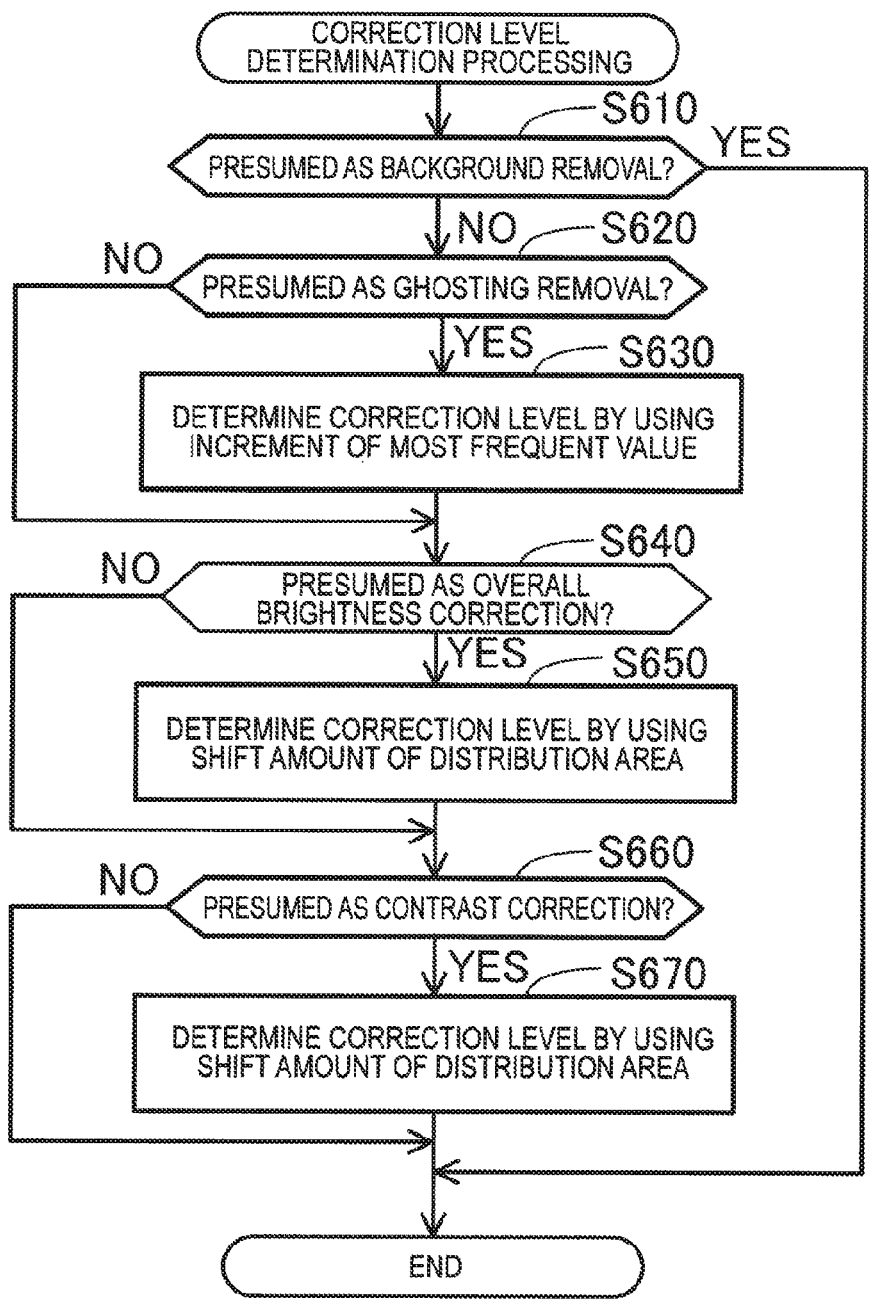
FIG. 16 is a flowchart of correction level determination processing.

The correction level determination processing of S40 in FIG. 5 will be described. FIG. 16 is a flowchart of the correction level determination processing. In S610, the CPU 210 determines whether the correspondence processing is presumed as the background removal processing by the correction type presumption processing of S30.

When the correspondence processing is presumed as the background removal processing (S610: YES), the CPU 210 terminates the correction level determination processing. The reason is that there is no correction level in the background removal processing, as described above.

When the correspondence processing is presumed not as the background removal processing (S610: NO), the CPU 210 determines whether the correspondence processing is presumed as the ghosting removal processing by the correction type presumption processing of S30, in S620.

When the correspondence processing is presumed as the ghosting removal processing (S620: YES), the CPU 210 determines the correction level L2, which is a parameter for the ghosting removal processing, by using an increment of number of most frequent pixels, in S630. Specifically, increments (RmN2-RmN), (GmN2-GmN) and (BmN2-BmN) of number of most frequent pixels RmN2, GmN2, BmN2 of the second corrected image IB2 with respect to number of most frequent pixels RmN, GmN, BmN of the respective color components of the original image IA are respectively calculated. An average value AD of the increments is calculated. Then, the correction level L2 is determined so that the greater the average value AD of the increments, the correction level L2 becomes higher. For example, the correction level L2 is determined by referring to a table in which a correspondence relation between the average value AD of the increments and the correction level L2 is defined in advance.

In this way, according to the correction level determination processing of this illustrative embodiment, the correction level L2 is determined using the increment of number of most frequent pixels, i.e., a difference between number of most frequent pixels RmN, GmN, BmN indicative of number of pixels having the background color value of the original image IA and number of most frequent pixels RmN2, GmN2, BmN2 indicative of number of pixels having the background color value of the corrected image IB. As a result, it is possible to appropriately determine the correction level L2 for the ghosting removal processing. More specifically, in the ghosting removal processing, as described above, the greater the correction level L2, the specific width ΔV2 indicative of an area of the background-approximate range RA2 (FIG. 2) becomes greater. Accordingly, the greater the correction level L2, number of pixels becoming the correction target increases, so that the increment of number of most frequent pixels increases. Accordingly, the greater the increment of number of most frequent pixels of the corrected image IB by the specific correction processing, the correction level L2 of the ghosting removal processing presumed as the correspondence processing is preferably set to be higher. Thereby, when executing the ghosting removal processing as the presumed correspondence processing at the second multifunction machine 200, it is possible to precisely reproduce the specific correction processing executed at the first multifunction machine 100.

When the correspondence processing is presumed not as the ghosting removal processing (S620: NO), the CPU 210 determines whether the correspondence processing is presumed as the overall brightness correction processing by the correction type presumption processing of S30, in S640.

When the correspondence processing is presumed as the overall brightness correction processing (S640: YES), the CPU 210 determines the correction level L3, which is a parameter for the overall brightness correction processing, by using a shift amount of the distribution area, in S650. Specifically, the CPU 210 selects one value, which can be preferably used to determine the correction level L3, of the most frequent values Rm, Gm, Bm and the opposite-side most frequent values Ro, Go, Bo of the respective color components of the original image IA. For example, as can be seen from the tone curve C3 of FIG. 3A, the correction amount is not constant in the vicinity of the minimum value (0, in this illustrative embodiment) or the maximum value (255, in this illustrative embodiment) of the range of the values that can be taken as the gradation value. Therefore, the value in the vicinity of the minimum value or the maximum value is not preferably used to determine the correction level L3. Accordingly, a value closest to an intermediate value (128, in this illustrative embodiment) of the range of the values that can be taken as the gradation value is selected. The CPU 210 calculates, as the shift amount, a difference between the selected value of the original image IA and the corresponding value of the corrected image IB. Then, the correction level L3 is determined so that the greater the calculated shift amount, the correction level L3 becomes higher. For example, the correction level L3 is determined by referring to a table in which a correspondence relation between the shift amount and the correction level L3 is defined in advance.

When the correspondence processing is presumed not as the overall brightness correction processing (S640: NO), the CPU 210 determines whether the correspondence processing is presumed as the contrast correction processing by the correction type presumption processing of S30, in S660.

When the correspondence processing is presumed as the contrast correction processing (S660: YES), the CPU 210 determines the correction level L4, which is a parameter for the contrast correction processing, by using the shift amount of the distribution area, in S670. Specifically, the CPU 210 selects one value, which can be preferably used to determine the correction level L4, of the most frequent values Rm, Gm, Bm and the opposite-side most frequent values Ro, Go, Bo of the respective color components of the original image IA. For example, as can be seen from the tone curve C4 of FIG. 3B, the correction amount is largely varied in the vicinity of the minimum value (0, in this illustrative embodiment) or the maximum value (255, in this illustrative embodiment) of the range of the values that can be taken as the gradation value and in the vicinity of the intermediate value (128, in this illustrative embodiment) of the range of the values that can be taken as the gradation value. Therefore, the value in the vicinity of the minimum value, the maximum value or the intermediate value is not preferably used to determine the correction level L4. Accordingly, a value closest to any one of values (64 and 192, in this illustrative embodiment) of 25% and 75% from the minimum value of the range of the values that can be taken as the gradation value is selected. The CPU 210 calculates, as the shift amount, a difference between the selected value of the original image IA and the corresponding value of the corrected image IB. Then, the correction level L4 is determined so that the greater the calculated shift amount, the correction level L4 becomes higher. For example, the correction level L4 is determined by referring to a table in which a correspondence relation between the shift amount and the correction level L4 is defined in advance.

In this way, according to the correction level determination processing of this illustrative embodiment, the correction levels L3, L4 are determined using the shift amount of the corresponding representative value of the corrected image IB with respect to the specific representative value (in this illustrative embodiment, one value selected from the most frequent values Rm, Gm, Bm and the opposite-side most frequent values Ro, Go, Bo) of the original image IA. As a result, it is possible to appropriately determine the correction levels L3, L4 for the overall brightness correction processing and the contrast correction processing. More specifically, in the overall brightness correction processing and the contrast correction processing, as described above, the greater the correction levels L3, L4, the correction amounts ΔV3, ΔV4 become greater (FIG. 3). As a result, the greater the correction levels L3, L4, the shift amount of the value of the pixel by the correction becomes greater. Accordingly, the greater the shift amount of the value of the pixel of the corrected image IB by the specific correction processing, the correction levels L3, L4 of the overall brightness correction processing and the contrast correction processing presumed as the correspondence processing are preferably set to be higher. Thereby, when executing the overall brightness correction processing and the contrast correction processing as the presumed correspondence processing at the second multifunction machine 200, it is possible to precisely reproduce the specific correction processing executed at the first multifunction machine 100.

When the correspondence processing is presumed not as the contrast correction processing (S660: NO), this means that the correspondence processing cannot be presumed by the correction type presumption processing of S30. Therefore, the correction level determination processing is terminated without determining the correction level.

Figure 17:
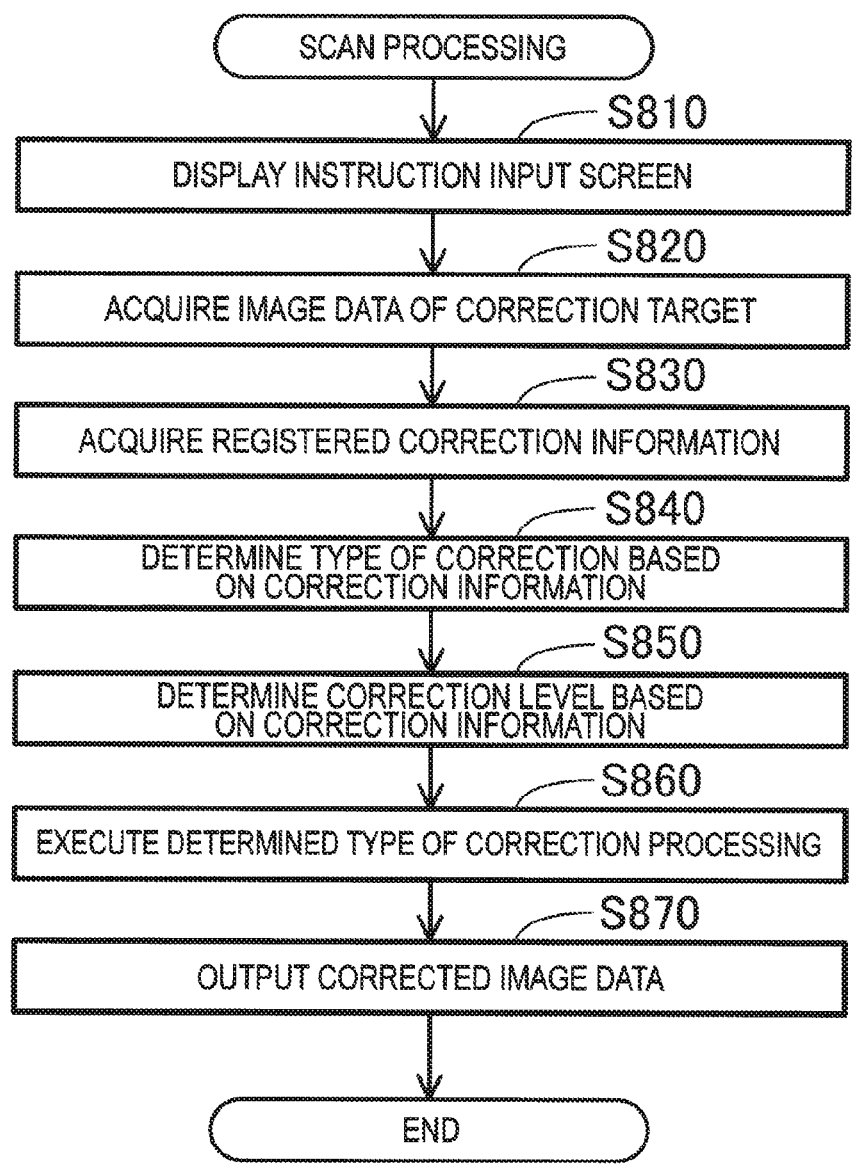
FIG. 17 is a flowchart of scan processing.

A-3-9. Scan Processing:

Subsequently, the scan processing, which is to be executed by the CPU 210 of the second multifunction machine 200 after the correction information registration processing, will be described. In the scan processing, the correction processing can be executed for the scan data by using the correction information registered in the correction information registration processing. The scan processing starts in response to a user's instruction. FIG. 17 is a flowchart of the scan processing.

Figure 18A:
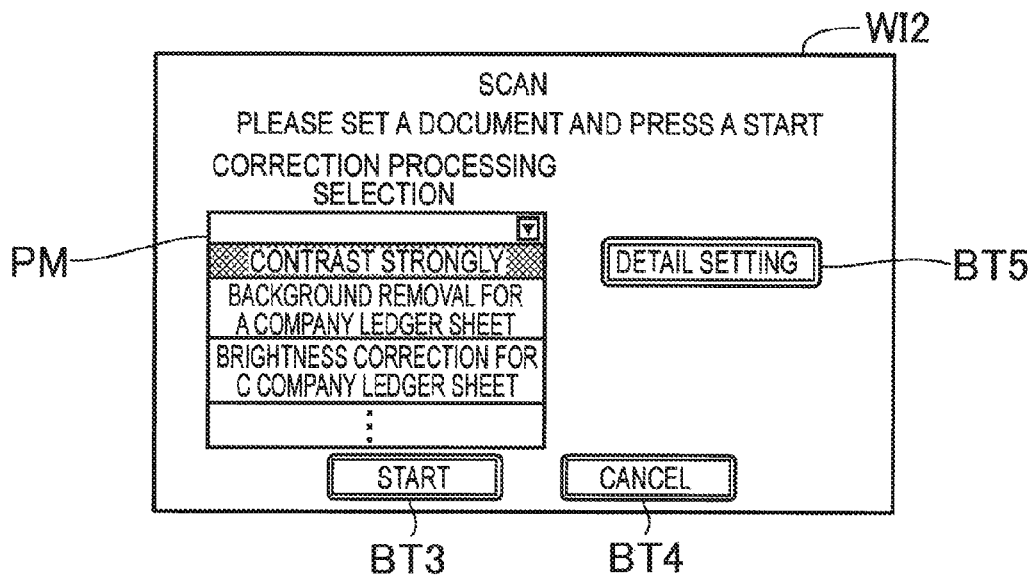
FIGS. 18A and 18B illustrate an example of an instruction input screen WI2 and a detail setting screen WI3.

In S810, the CPU 210 displays, on the display unit 270, an instruction input screen WI2 with which the user inputs an instruction relating to the scan processing. FIG. 18 illustrates an example of the instruction input screen WI2 and a detail setting screen WI3. The instruction input screen WI2 of FIG. 18A includes a pull-down menu PM and buttons BT3, BT4. The pull-down menu PM is an input element for inputting a selection instruction to select one correction information, which indicates the correction processing to be executed for the scan data, from the registered plurality of correction information.

Each of plurality of items that can be selected from the pull-down menu PM indicates a registration name of the corresponding correction information. The user can easily input the selection instruction of one correction information by selecting one registration name from the pull-down menu PM. The plurality of selectable correction information includes N correction information registered by executing N times (N: an integer of 2 or greater) the correction information registration processing of FIG. 5. In the N times correction information registration processing, the combinations of N sets of the original image data and the corrected image data are used. Each of the combinations of N sets is a combination of one image data of N different first original image data and one first corrected image data corresponding to the one image data, for example. Therefore, it can be said that the selection instruction of one correction information is a selection instruction to select one processing to be executed from the N correspondence processing presumed for the combinations of N sets. Also, the plurality of selectable correction parameters may include one or more default correction information registered in advance. In the meantime, the CPU 210 may associate and store the used original image data and the corrected image data when registering the correction information in S70 of FIG. 5, or image data representing respective thumbnail images of the original image IA and the corrected image IB and the correction information in the volatile storage device 230. In this case, the CPU 210 may display, on the instruction input screen WI2 of FIG. 18A, the original image IA and the corrected image IB corresponding to the correction information selected from the pull-down menu PM or the thumbnail images of the images. By doing so, when the user selects the registered correction information, the user can easily check the contents of the correction processing to be executed on the instruction input screen WI2. Particularly, this configuration is convenient when the user having registered the correction information is different from the user executing the correction processing based on the correction information or when the plurality of correction information is registered, for example.

Figure 18B:
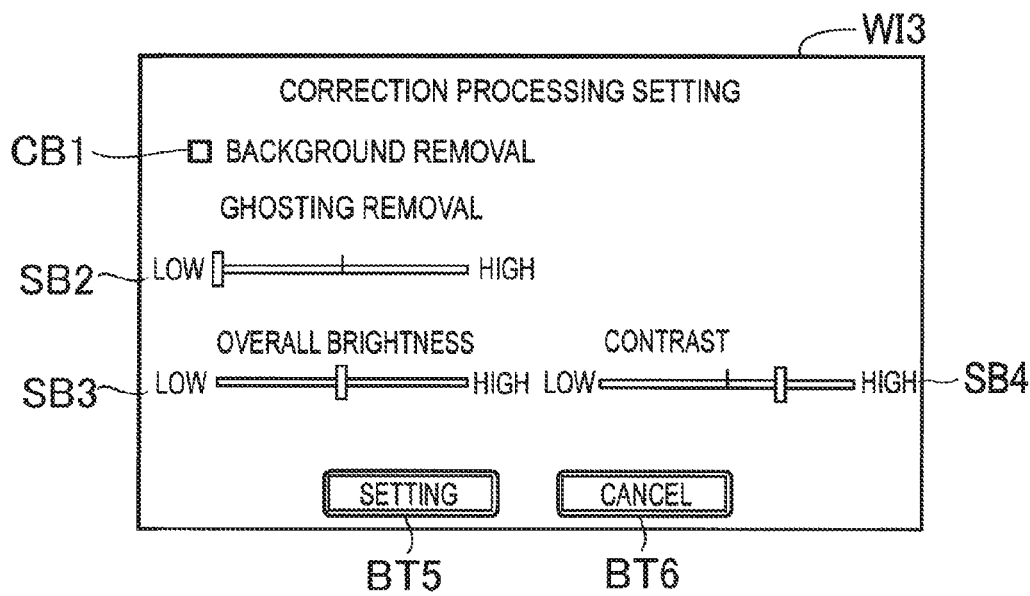

When a detail setting button BT5 is pressed, the CPU 210 displays a detail setting screen WI3 of FIG. 18B on the display unit 270. Specifically, the detail setting screen WI3 includes a check box CB1, three slide bars SB2 to SB4 and two buttons BT5, BT6. The check box CB1 is a UI element for inputting an instruction as to whether or not to execute the background removal processing. The slide bar SB2 is a UI element for inputting the correction level L2 of the ghosting removal processing. When a slide of the slide bar SB2 is located at a left end position, it indicates that the ghosting removal processing is not to be executed (i.e., the correction level L2=0). The slide bars SB3, SB4 are UI elements for inputting the correction levels L3, L4 of the overall brightness correction processing and the contrast correction processing. When sliders of the slide bars SB3, SB4 are located at central positions, it indicates that the overall brightness correction processing and the contrast correction processing are not to be executed (i.e., the correction level L3, L4=0). In the detail setting screen WI3, the setting contents based on the correction information selected from the pull-down menu PM of the instruction input screen WI4 displayed just previously are shown. For example, in the example of FIG. 18B, the setting with which the background removal processing, the ghosting removal processing and the overall brightness correction processing are not to be executed and the contrast correction of making the contrast high is to be executed is shown. By seeing the detail setting screen WI3, the user can recognize the manual setting method for executing the correction processing based on the registered correction information, i.e., the same correction processing as the specific correction processing executed for the original image data at the first multifunction machine 100. Further, the user can adjust the setting of the correction processing by operating the check box CB1 and the slide bars SB2 to SB4.

When the user presses the detail setting button BT5, the CPU 210 activates the settings of the correction processing on the detail setting screen WI3 at that time and returns to the state where the instruction input screen WI2 is displayed. When the user presses a cancel button BT6, the CPU 210 returns to the state where the instruction input screen WI2 is displayed.

When a start button BT3 of the instruction input screen WI2 is pressed, the CPU 210 proceeds to S820. When a cancel button BT4 of the instruction input screen WI2 is pressed, the CPU 210 terminates the scan processing.

In S820, the CPU 210 generates the scan data of the processing target by reading the document with the scanner unit 250, thereby acquiring the scan data of the processing target. Instead, for example, the scan data of the processing target may be acquired from one or more scan data generated in advance by reading documents with the scanner unit 250 and stored in the non-volatile storage device 220. The acquired scan data is stored in the buffer area 231.

In S830, the CPU 210 acquires the correction information selected from the pull-down menu PM upon the pressing of the start button BT3 of the instruction input screen WI2 from the volatile storage device 230. That is, one correction information selected by the selection instruction input by the user through the pull-down menu PM is acquired. As described above, the correction information includes the information indicative of the type of the correction processing (in this illustrative embodiment, any one of the background removal processing, the ghosting removal processing, the overall brightness correction processing and the contrast correction processing) and the information indicative of the correction level.

In S840, the CPU 210 determines the type of the correction processing to be executed based on the acquired correction information. In S840, the CPU 210 determines the correction level of the correction processing to be executed based on the acquired correction information.

In S860, the CPU 210 executes the correction processing of the type determined in S840 for the scan data of the processing target with the correction level determined in S850, thereby generating the corrected scan data. The specific correction processing is as described above with reference to FIGS. 2 and 3.

In S870, the CPU 210 outputs the corrected image data. Specifically, the CPU 210 outputs the corrected image data to the volatile storage device 230, and preserves the second corrected image data in the volatile storage device 230. Instead, the output of the corrected image data may also be made by transmitting the corrected image data to the user's terminal, or controlling the printer unit 240 to print the corrected image by using the corrected image data.

According to the above-described scan processing of this illustrative embodiment, the scan data representing the image of the correction target is acquired (S820). The correspondence processing presumed in the correction type presumption processing, i.e., the correction processing determined in S840 based on the registered correction information is executed for the scan data (S860). As a result, it is possible to easily execute the correspondence processing to the specific correction processing, which has been executed for the first original image data, for the scan data. Therefore, it is possible to reduce the trouble of the user who uses the correction processing.

Further, the instruction input screen WI2, which includes the pull-down menu PM for inputting the selection instruction to select one correction processing to be executed, is displayed on the display unit 270 (S810). Then, one correction processing selected by the selection instruction is executed for the scan data (S840 to S860). Therefore, it is possible to execute the appropriate processing for the scan data from the plurality of correspondence processing presumed in the correction information registration processing of FIG. 5, based on the user's instruction.

Also, according to the above illustrative embodiment, in the registration processing of FIG. 5, based on the comparison of the original image data and the corrected image data, the correspondence processing to the specific correction processing executed for the original image data is presumed from plural types of candidates for processing that can be executed by the first multifunction machine 100 (S30 in FIG. 5), and the correction level, which is a parameter for the presumed correspondence processing, is determined (S40 in FIG. 5). Then, in the scan processing of FIG. 17, the presumed correspondence processing is executed for the scan data by using the determined correction level. As a result, it is possible to reduce the user's trouble to set the correction level and the type of the correction processing at the image processing apparatus.

B. Modified Embodiments (1) In S410 of FIG. 14 and S510 of FIG. 15 of the illustrative embodiment, the representative values of the original image IA and the corrected image IB, which are to be used to determine whether the distribution area is shifted, are the most frequent value and the opposite-side most frequent value of each color component. However, this disclosure is not limited thereto. For example, the intermediate values, the minimum values and the maximum values of the two distribution areas (for example, the two distribution areas RDo, RDb of the R component in FIG. 8B) of each color component of the original image IA may be used as the representative values of the original image IA and the corrected image IB. Alternatively, the histograms of the respective brightness of the original image IA and the corrected image IB may be generated, and the most frequent values and the opposite-side most frequent values of the histograms of the brightness may be used as the representative values of the original image IA and the corrected image IB.

(2) In the correction type presumption processing of the illustrative embodiment, the correspondence processing is presumed by using, all of the shifts of the most frequent value and the opposite-side most frequent value, the increase or decrease of number of most frequent pixels and the increase or decrease of the width of the distribution area. Instead, for example, the correspondence processing may be presumed based on only one of the shift of the opposite-side most frequent value, the increase or decrease of number of most frequent pixels and the increase or decrease of the width of the distribution area. For example, when the processing becoming the candidate of the correspondence processing is only the overall brightness correction processing and the contrast correction processing, it is possible to presume whether the correspondence processing is the overall brightness or the contrast correction processing just by determining whether the shift directions of the most frequent value and the opposite-side most frequent value are the same direction or the opposite directions. For example, when the processing becoming the candidate of the correspondence processing is only the background removal processing and the ghosting removal processing, it is possible to presume whether the correspondence processing is the background removal processing or the ghosting removal processing just by determining whether the most frequent value is not shifted or whether the most frequent value is shifted to the position indicative of white.

(3) In the ghosting removal presumption processing of FIG. 13, the necessary condition for presuming that the correspondence processing is the ghosting removal processing is both the conditions that number of most frequent pixels is increased and that the width of the distribution area is decreased. Instead, it may be determined as to whether number of most frequent pixels is increased or whether the width of the distribution area is decreased, and a condition that any one condition is satisfied may be set as the necessary condition for presuming that the correspondence processing is the ghosting removal processing. In general, when number of most frequent pixels is increased, the width of the distribution area is decreased, and when the width of the distribution area is decreased, number of most frequent pixels is increased. Therefore, even any one condition may be sufficient in some cases.

(4) In the illustrative embodiment, the correction levels L2 to L4 are determined as the correction parameter in the correction level determination processing. However, the other parameters may be determined. For example, instead of the correction level L2, the specific width $\Delta V2$ of the ghosting removal processing may be determined as the correction parameter. Also, instead of the correction levels L3, L4, the correction amounts $\Delta V3$, $\Delta V4$ of the overall brightness correction processing and the contrast correction processing may be determined as the correction parameter.

(5) In the illustrative embodiment, the reading apparatus configured to generate the original image data and the apparatus configured to execute the specific correction processing for the original image data and to generate the corrected image data are the same apparatus (i.e., the first multifunction machine 100) but may be different. For example, the original image data generated by the first multifunction machine 100 may be supplied to the user's terminal (for example, a PC and a smart phone) and a CPU of the terminal may execute the specific correction processing. In this case, for example, the original image data and the corrected image data may be transmitted from the terminal to the second multifunction machine 200 through the communication unit 180 and may be thus acquired by the second multifunction machine 200.

(6) In the illustrative embodiment, the reading apparatus (i.e., the first multifunction machine 100) configured to generate the scan data of the correction target acquired in S820 of FIG. 18 and the reading apparatus configured to execute the presumed correspondence processing for the scan data are the same apparatus (i.e., the second multifunction machine 200) but may be different. For example, the scan data of the correction target generated by the second multifunction machine 200 may be supplied to the user's terminal, and the CPU of the terminal may execute the presumed correspondence processing. In this case, the CPU of the terminal may acquire the original image data and the corrected image data from the first multifunction machine 100, execute the correction information registration processing, acquire the scan data of the correction target from the second multifunction machine 200, and execute the presumed correspondence processing.

(7) In the illustrative embodiment, the reading apparatus (i.e., the first multifunction machine 100) configured to generate the original image data and the reading apparatus (i.e., the second multifunction machine 200) configured to generate the scan data of the correction target are different but may be the same. For example, the original image data may be generated at the second multifunction machine 200 and supplied to the user's terminal, and the CPU of the terminal may execute the specific correction processing. In this case, the CPU 210 may be configured to execute the correction information registration processing so that the CPU 210 of the second multifunction machine 200 can execute the same processing as the specific correction processing for the scan data of the correction target, which is generated at the second multifunction machine 200.

(8) In the illustrative embodiment, the reading apparatus (i.e., the first multifunction machine 100) configured to execute the specific correction processing and the reading apparatus (i.e., the second multifunction machine 200) configured to execute the presumed correspondence processing are different but may be the same. For example, it is assumed that the correction information of the specific correction processing, which was executed for the previously generated original image data at the second multifunction machine 200, is deleted. In this case, the CPU 210 may be configured to execute the correction information registration processing so that the CPU 210 of the second multifunction machine 200 can execute the same processing as the previously executed specific correction processing for the scan data of the correction target.

(9) In the illustrative embodiment, the original image data is the scan data generated by the scanner unit 250. This disclosure is not limited thereto, and a variety of image data representing the optically read image may be adopted. For example, the image data, which is generated when a document is optically read by the photographing of a digital camera, may be adopted. Also, the original image data is not limited to the image data generated by the reading apparatus (scanner or digital camera), and may be image data prepared using an application program such as drawing preparation and document preparation.

(10) In the illustrative embodiment, a part of the configurations that are implemented by the hardware may be replaced with the software. Also, a part or all of the configurations that are implemented by the software may be replaced with the hardware.

Although this disclosure has been described based on the illustrative embodiments and the modified embodiments, the illustrative embodiments are provided only to easily understand this disclosure, not to limit this disclosure. This disclosure can be changed and improved without departing from the gist and scope of this disclosure and includes the equivalents thereto.

What is claimed is:

1. An image processing apparatus comprising a controller configured to execute correction processing of image data read by a reading apparatus, the controller configured to perform:

acquiring, by a second reading apparatus, first original image data representing an original image and corrected image data representing a corrected original image, the corrected image data being generated by a first reading apparatus by executing specific correction processing on the first original image data;

calculating a first index value and a second index value, the first index value relating to a color distribution of the original image by using the first original image data, and the second index value relating to a color distribution of the corrected image by using the corrected image data;

determining which processing, among a plurality of processing candidates that are executable by the second reading apparatus, corresponds to the specific correction processing performed by the first reading apparatus, based on comparison of the calculated first index value and the calculated second index value; and correcting, by the second reading apparatus, second original image data using the specific image processing;

wherein in a case where the result of the comparison of the calculated first index value and the calculated second index value is a first result, the controller determines that a first correction processing which is executable by the image processing apparatus corresponds to the specific correction processing, and wherein in a case where the result of the comparison of the calculated first index value and the calculated second index value is a second result, the controller determines that a second correction processing which is executable by the image processing apparatus corresponds to the specific correction processing.

2. The image processing apparatus according to claim 1,
wherein, to perform the calculating, the controller is configured to perform:
generating a first histogram indicative of a distribution of plurality of pixel values in the original image by using the first original image data;
calculating the first index value by using the first histogram;
generating a second histogram indicative of a distribution of plurality of pixel values in the corrected image by using the corrected image data; and
calculating the second index value by using the second histogram.

3. The image processing apparatus according to claim 1,
wherein, to perform the calculating, the controller is configured to perform calculating, as the first index value and the second index value, at least one of a (a) representative value of plurality of pixel values in an image, (b) number of representative pixels, which indicates number of pixels having the representative value, of the plurality of pixels in the image, and (c) a distribution width value, which indicates a width of a range of pixels, number of which is equal to or greater than a reference number, of the plurality of pixels in the image, and
wherein, to perform the determining, the controller is configured to perform
determining the processing corresponding to the specific correction processing, based on at least one of a shift of the representative value between the original image and the corrected image, an increase or decrease of number of representative pixels and an increase or decrease of the distribution width value.

4. The image processing apparatus according to claim 3,
wherein the plurality of processing candidates comprises a plurality of processings of correcting a background color in the image,
wherein, to perform the calculating, the controller is configured to perform
calculating, as the representative value, a most frequent value of the plurality of pixel values in the image for each of the original image and the corrected image, and
wherein, to perform the determining, the controller is configured to perform
determining the processing corresponding to the specific correction processing by using the respective most frequent values of the original image and the corrected image.

5. The image processing apparatus according to claim 3,
wherein the plurality of the processing candidates comprises a first processing of changing a background color in the image into a specific color different from the background color,
wherein, to perform the calculating, the controller is configured to perform
calculating a background color value, which is the representative value indicative of the background color of the image, for each of the original image and the corrected image, and wherein, to perform the determining, the controller is configured to perform
determining that the processing corresponding to the specific correction processing is the first processing, if the background color value of the original image indicates a color different from the specific color and the background color value of the corrected image indicates the specific color.

6. The image processing apparatus according to claim 3,
wherein the plurality of the processing candidates comprises a second processing of changing a color of a background in an image into a representative color based on a value of a pixel in the background,
wherein, to perform the calculating, the controller is configured to perform
calculating a background color value, which is the representative value indicative of the color of the background in the image, and at least one of number of background color pixels, which is number of representative pixels indicative of the background color value, and the distribution width value, for each of the original image and the corrected image, and
wherein, to perform the determining, the controller is configured to perform
determining that the processing corresponding to the specific correction processing is the second processing, in at least one of cases:
(a) where the background color value of the corrected image does not shift with respect to the background color value of the original image and number of background color pixels of the corrected image increases with respect to number of background color pixels of the original image; and
(b) where the background color value of the corrected image does not shift with respect to the background color value of the original image and the distribution width value of the corrected image decreases with respect to the distribution width value of the original image.

7. The image processing apparatus according to claim 3,
wherein the plurality of the processing candidates comprises a plurality of processings of correcting brightness of the image,
wherein, to perform the calculating, the controller is configured to perform
calculating a plurality of representative values for each of the original image and the corrected image, and
wherein, to perform the determining, the controller is configured to perform
determining the processing corresponding to the specific correction processing by using a direction in which the corresponding representative value of the corrected image shifts with respect to each of the plurality of representative values of the original image.

8. The image processing apparatus according to claim 7,
wherein the plurality of the processing candidates of candidates for processing comprises third processing of increasing or decreasing brightness of the whole image,
wherein, to perform the calculating, the controller is configured to perform
calculating the plurality of representative values and the distribution width value for each of the original image and the corrected image, and
wherein, to perform the determining, the controller is configured to perform
determining that the processing corresponding to the specific correction processing is the third processing, if the corresponding representative value of the corrected image shifts in the same direction with respect to each of the plurality of representative values of the original image and the distribution width value of the corrected image does not change with respect to the distribution width value of the original image.

9. The image processing apparatus according to claim 7, wherein the plurality of the processing candidates comprises fourth processing of changing contrast of the image,
wherein, to perform the calculating, the controller is configured to perform calculating the plurality of representative values and the distribution width value for each of the original image and the corrected image, and
wherein, to perform the determining, the controller is configured to perform
determining that the processing corresponding to the specific correction processing is the fourth processing, in a case:
where a first value in a first range, in which the brightness is relatively low, of the plurality of representative values of the corrected image shifts in a first direction with respect to a corresponding value of the plurality of representative values of the original image; and
where a second value in a second range, in which the brightness is relatively high, of the plurality of representative values of the corrected image shifts in a second direction opposite to the first direction with respect to a corresponding value of the plurality of representative values of the original image.

10. The image processing apparatus according to claim 1, wherein the controller further performs:
determining a correction parameter for the processing corresponding to the specific correction processing, the specific correction processing being determined among the plurality of the processing candidates, by using a method corresponding to the specific correction processing.

11. The image processing apparatus according to claim 10,
wherein the plurality of the processing candidates comprises second processing of changing a color of a background in an image into a representative color based on a value of a pixel in the background, and
wherein, to perform the determining, the controller is configured to perform
determining a correction parameter for the second processing by using a difference between number of representative pixels indicative of number of pixels, which have a representative value indicative of a background color of the original image, and number of representative pixels indicative of number of pixels, which have a representative value indicative of a background color of the corrected image.

12. The image processing apparatus according to claim 10,
wherein the plurality of the processing candidates comprises at least one of third processing of increasing or decreasing brightness of an whole image and fourth processing of changing contrast of the image, and
wherein, to perform the determining, the controller is configured to perform
determining a correction parameter for one of the third processing and the fourth processing by using a shift amount of a corresponding representative value of the corrected image with respect to a specific representative value of the original image.

13. The image processing apparatus according to claim 10,
wherein the controller further performs:
displaying a parameter display screen for displaying the determined correction parameter to a user; and
adjusting the determined correction parameter, based on an adjustment instruction to be input through the parameter display screen.

14. The image processing apparatus according to claim 1,
wherein the controller further performs
notifying a user of the processing corresponding to the specific correction processing presumed from the plurality of the processing candidates.

15. The image processing apparatus according to claim 1,
wherein, to perform the acquiring, the controller is configured to perform
acquiring target image data indicative of an image of a correction target; and
wherein the controller further performs
executing the processing corresponding to the specific correction processing determined among the plurality of the processing candidates for the target image data.

16. The image processing apparatus according to claim 15,
wherein, to perform the determining, the controller is configured to perform
determining the processing corresponding to N specific correction processing respectively corresponding to combinations of N sets of the first original image data and the corrected image data,
wherein the controller further performs
displaying an instruction input screen for inputting a selection instruction to select one of the N processing presumed for the combinations of the N sets, and
wherein, to perform the executing, the controller is configured to perform
executing the one processing selected by the selection instruction.

17. The image processing apparatus according to claim 15,
wherein both of the first original image data and the corrected image data are generated by an apparatus different from the image processing apparatus, and
wherein the target image data is generated by the image processing apparatus.

18. A non-transitory computer-readable medium having program instructions to control a computer to execute correction processing of image data read by a reading apparatus, the program instructions causing the computer to perform:
acquiring, by a second reading apparatus, first original image data representing an original image and corrected image data representing a corrected image, the corrected image data being generated by a first reading apparatus by executing specific correction processing for the first original image data;
calculating a first index value and a second index value, the first index value relating to a color distribution of the original image by using the first original image data, and the second index value relating to a color distribution of the corrected image by using the corrected image data;
determining which processing, among a plurality of processing candidates that are executable by the second reading apparatus, corresponds to the specific correction processing performed by the first reading apparatus, based on comparison of the calculated first index value and the calculated second index value;

wherein in a case where the result of the comparison of the calculated first index value and the calculated second index value is a first result, the controller determines that a first correction processing which is executable by the image processing apparatus corresponds to the specific correction processing, and wherein in a case where the result of the comparison of the calculated first index value and the calculated second index value is a second result, the controller determines that a second correction processing which is executable by the image processing apparatus corresponds to the specific correction processing.

* * * * *